US010055752B2

(12) United States Patent
Boldyrev et al.

(10) Patent No.: US 10,055,752 B2
(45) Date of Patent: Aug. 21, 2018

(54) METHOD AND APPARATUS FOR PERFORMING REAL-TIME OUT HOME ADVERTISING PERFORMANCE ANALYTICS BASED ON ARBITRARY DATA STREAMS AND OUT OF HOME ADVERTISING DISPLAY ANALYSIS

(71) Applicant: HERE Global B.V., Veldhoven (NL)

(72) Inventors: Sergey Boldyrev, Söderkulla (FI); Mohammed Ali Wieslaw Khalesi, Veldhoven (NL); Lauri Aarno Olavi Tarkkala, Berlin (DE)

(73) Assignee: HERE Global B.V., Veldhoven (NL)

( * ) Notice: Subject to any disclaimer, the term of this patent is extended or adjusted under 35 U.S.C. 154(b) by 345 days.

(21) Appl. No.: 13/954,558

(22) Filed: Jul. 30, 2013

(65) Prior Publication Data

US 2015/0039415 A1    Feb. 5, 2015

(51) Int. Cl.
*G06Q 30/00* (2012.01)
*G06Q 30/02* (2012.01)

(52) U.S. Cl.
CPC ........ *G06Q 30/0242* (2013.01); *G06Q 30/00* (2013.01); *G06Q 30/0255* (2013.01)

(58) Field of Classification Search
None
See application file for complete search history.

(56) References Cited

U.S. PATENT DOCUMENTS

| | | | |
|---|---|---|---|
| 6,671,615 B1 | 12/2003 | Becker et al. | |
| 6,760,046 B2 * | 7/2004 | I'Anson et al. | 715/746 |
| 6,836,724 B2 | 12/2004 | Becker et al. | |
| 7,089,264 B1 | 8/2006 | Guido et al. | |
| 7,092,964 B1 | 8/2006 | Dougherty et al. | |
| 7,493,372 B2 * | 2/2009 | Crabtree et al. | 709/217 |
| 7,620,026 B2 * | 11/2009 | Anschutz et al. | 370/338 |
| 7,814,106 B2 | 10/2010 | Guido et al. | |
| 7,925,549 B2 | 4/2011 | Looney et al. | |
| 7,933,897 B2 * | 4/2011 | Jones et al. | 707/723 |
| 8,073,460 B1 * | 12/2011 | Scofield et al. | 455/456.1 |

(Continued)

OTHER PUBLICATIONS

Merriam-Webster's Collegiate Dictionary (Marriam-Webster, Incorporated, 1998), pp. 60, 223.*

(Continued)

*Primary Examiner* — Bennett M Sigmond
(74) *Attorney, Agent, or Firm* — Ditthavong & Steiner, P.C.

(57) ABSTRACT

An approach is provided for determining performance of location-based displays. The coincidences computational platform may process and/or facilitate a processing of at least one data stream associated with at least one device to cause, at least in part, an extraction of one or more data sets. Then, the content platform may determine one or more arbitrary events data sets from among the one or more data sets based, at least in part, on a coincident occurrence of casual and non-causal events of the one or more arbitrary events data sets with at least on location-based display. Lastly, the content platform may determine one or more information placement parameters for the at least one location-based display based, at least in part, on the one or more arbitrary events data sets.

20 Claims, 27 Drawing Sheets

(56) References Cited

U.S. PATENT DOCUMENTS

| | | | | |
|---|---|---|---|---|
| 8,179,241 | B2* | 5/2012 | Sakai | G08G 1/164 340/436 |
| 8,504,062 | B2* | 8/2013 | Weiss | 455/456.1 |
| 8,650,070 | B2* | 2/2014 | Pattan | H04W 4/206 705/14.16 |
| 8,655,726 | B1* | 2/2014 | Favero et al. | 705/14.53 |
| 8,725,133 | B2* | 5/2014 | Park | G06F 3/0484 455/3.06 |
| 8,775,251 | B1* | 7/2014 | Archak | G06Q 30/0275 705/14.13 |
| 8,800,056 | B2* | 8/2014 | Chow | 726/28 |
| 8,910,309 | B2* | 12/2014 | Harrison | H04L 63/107 726/30 |
| 9,159,238 | B2* | 10/2015 | Manolescu | G08G 1/20 |
| 9,348,323 | B2* | 5/2016 | Yamaguchi | G06F 21/31 |
| 2002/0032035 | A1 | 3/2002 | Teshima | |
| 2002/0111172 | A1* | 8/2002 | DeWolf et al. | 455/456 |
| 2005/0021393 | A1* | 1/2005 | Bao | G06Q 30/02 705/14.64 |
| 2008/0091516 | A1* | 4/2008 | Giunta | 705/10 |
| 2008/0091518 | A1* | 4/2008 | Eisenson | G06Q 30/0267 705/14.64 |
| 2008/0214210 | A1* | 9/2008 | Rasanen et al. | 455/456.3 |
| 2008/0299943 | A1 | 12/2008 | Jacobson et al. | |
| 2009/0101706 | A1* | 4/2009 | Boyd | G06Q 30/02 235/380 |
| 2009/0106100 | A1 | 4/2009 | Mashinsky | |
| 2009/0222346 | A1* | 9/2009 | Greene et al. | 705/14 |
| 2010/0205039 | A1* | 8/2010 | Basak et al. | 705/10 |
| 2010/0324977 | A1* | 12/2010 | Dragt | G06Q 30/0257 705/14.1 |
| 2011/0035282 | A1* | 2/2011 | Spatscheck | G06Q 30/02 705/14.58 |
| 2011/0231483 | A1 | 9/2011 | Derraugh et al. | |
| 2011/0251891 | A1* | 10/2011 | Satyavolu | G06Q 30/02 705/14.49 |
| 2012/0004961 | A1* | 1/2012 | Flynn | G06Q 30/02 705/14.5 |
| 2012/0052884 | A1* | 3/2012 | Bogatin | 455/456.6 |
| 2012/0084248 | A1* | 4/2012 | Gavrilescu | 706/52 |
| 2012/0143678 | A1* | 6/2012 | Sathyanath et al. | 705/14.46 |
| 2012/0143695 | A1* | 6/2012 | Nandagopal et al. | 705/14.66 |
| 2012/0143718 | A1* | 6/2012 | Graham | G06Q 30/0631 705/26.7 |
| 2012/0221657 | A1* | 8/2012 | Zeevi | G06F 9/54 709/206 |
| 2012/0232971 | A1* | 9/2012 | Pabst | G06Q 30/0207 705/14.12 |
| 2012/0246009 | A1* | 9/2012 | Hafez | G06Q 30/0277 705/14.66 |
| 2012/0323674 | A1 | 12/2012 | Simmons et al. | |
| 2012/0323685 | A1 | 12/2012 | Ullah | |
| 2013/0006754 | A1* | 1/2013 | Horvitz | G06Q 30/0251 705/14.43 |
| 2013/0060644 | A1* | 3/2013 | Le Ouay | G06Q 30/0241 705/14.69 |
| 2014/0081517 | A1* | 3/2014 | Barrett | B60K 35/00 701/36 |
| 2014/0085179 | A1* | 3/2014 | Krig | G06F 3/147 345/156 |
| 2014/0157199 | A1* | 6/2014 | Kahler | G06Q 30/0267 715/833 |

OTHER PUBLICATIONS

Merriam-Webster's Collegiate Dictionary (Merriam-Webster, Incorporated, 1998) at p. 250.*

Marquardt, et al., General Engagement: Facilitating Information Exch. betw. Digital Devices as a function of Proximity, ITS'12, Nov. 11-14, 2012, available at http://www.sebastianboring.conn/content/publications/prints/marquardt.ITS-2012. gradualengagement.pdf (last visited Apr. 11, 2018) (Year: 2012).*

D. Prayoga, "Effectiveness of Billboard from the consumer's perspective in Jakarta towards their purchase intention", BINUS University, published in 2011, pp. 1-16.

"Infolinks Drives Traffic with Ad Tools Including InSearch, InTag", retrieved from http://www.infolinks.com/company, Nov. 6, 2013.

* cited by examiner

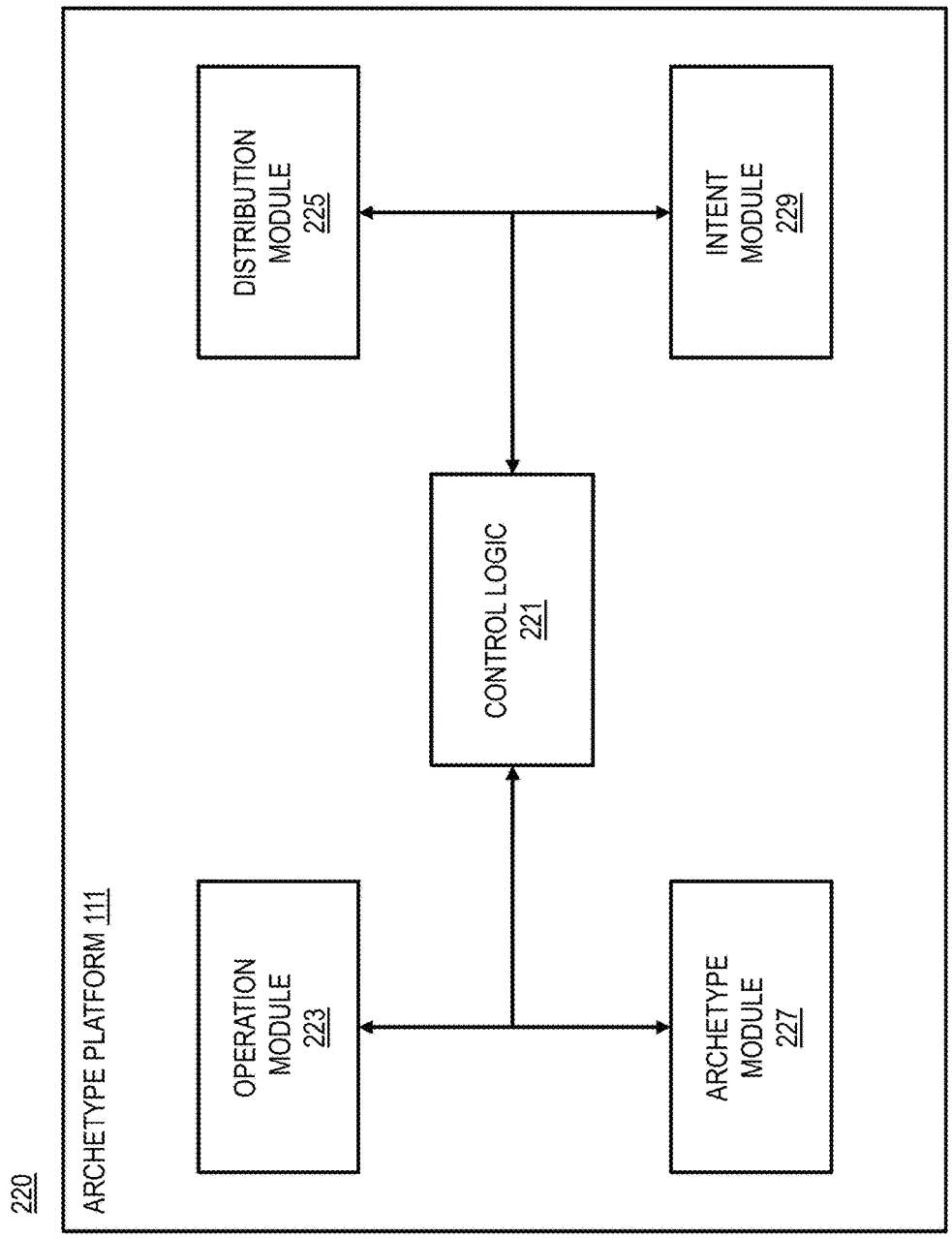

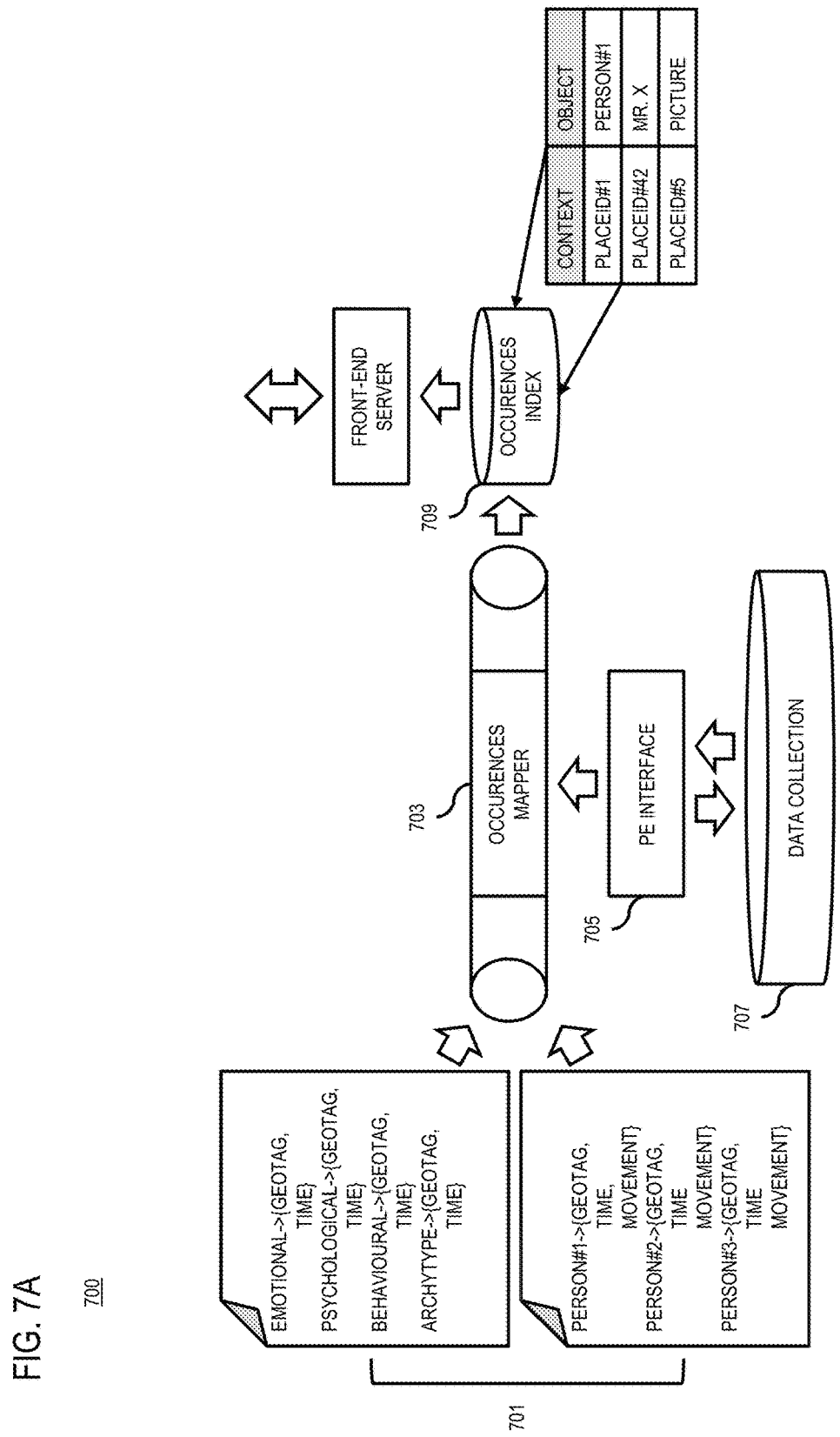

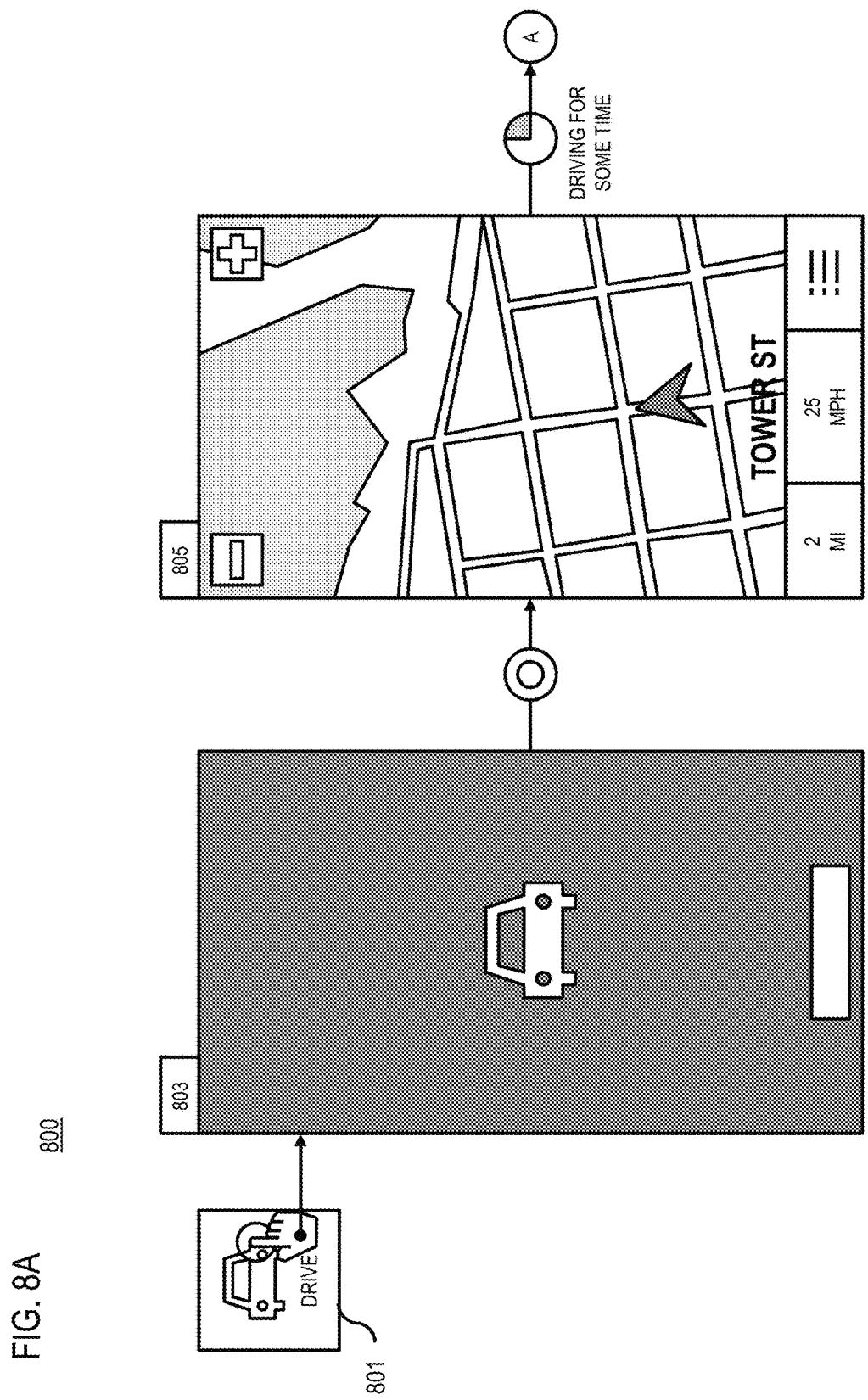

METHOD AND APPARATUS FOR PERFORMING REAL-TIME OUT HOME ADVERTISING PERFORMANCE ANALYTICS BASED ON ARBITRARY DATA STREAMS AND OUT OF HOME ADVERTISING DISPLAY ANALYSIS

BACKGROUND

Service providers and device manufacturers (e.g., wireless, cellular, etc.) are continually challenged to deliver value and convenience to consumers by, for example, providing compelling network services. One area of interest has been the development of tailoring content distribution to user context and/or interest. For example, consumers may see or pass by real-time and out of home advertising content. For example, consumers may frequently see out of home advertisements on out of home assets such as billboards, bus shelters and so on. Advertising management for the out of home assets, however, may have little relevance as to the effectiveness of the out of home assets or whether users are interested with the advertisements on said assets. The advertising management may indirectly determine that sales have increased for products advertised, but such analysis may take weeks and connections between user actions and advertisements and may not be immediate. As a result, content providers face significant challenges distributing content tailored to user context and/or interest.

SOME EXAMPLE EMBODIMENTS

Therefore, there is a need for an approach for determining performance of location-based displays.

According to one embodiment, a method processing and/or facilitating a processing of at least one data stream associated with at least one device to cause, at least in part, an extraction of one or more data sets. The method also comprises determining one or more arbitrary events data sets from among the one or more data sets based, at least in part, on a coincidence of the one or more arbitrary events data sets with at least one location-based display. The method further comprises determining one or more information placement parameters for the at least one location-based display based, at least in part, on the one or more arbitrary events data sets. In one embodiment, a display may include one or more surfaces on which information is shown or conveyed. In one embodiment, these surfaces are physical areas with bound perimeters. For example, the areas may have set or standardized dimensions. For example, location-based displays may include billboards, display surfaces at bus stops, wall space, or any signage. To be location-based, the displays may have set or pre-configured, static physical locations.

According to another embodiment, an apparatus comprises at least one processor, and at least one memory including computer program code for one or more computer programs, the at least one memory and the computer program code configured to, with the at least one processor causing, at least in part, the apparatus to process and/or facilitate a processing of at least one data stream associated with at least one device to cause, at least in part, an extraction of one or more data sets. The apparatus is also caused to determine one or more arbitrary events data sets from among the one or more data sets based, at least in part, on a coincidence of the one or more arbitrary events data sets with at least one location-based display. The apparatus is further caused to determine one or more information placement parameters for the at least one location-based display based, at least in part, on the one or more arbitrary events data sets.

According to another embodiment, a computer-readable storage medium carries one or more sequences of one or more instructions which, when executed by one or more processors, cause, at least in part, an apparatus to process and/or facilitate a processing of at least one data stream associated with at least one device to cause, at least in part, an extraction of one or more data sets. The apparatus is also caused to determine one or more arbitrary events data sets from among the one or more data sets based, at least in part, on a coincidence of the one or more arbitrary events data sets with at least one location-based display. The apparatus is further caused to determine one or more information placement parameters for the at least one location-based display based, at least in part, on the one or more arbitrary events data sets.

According to another embodiment, an apparatus comprises means for processing and/or facilitating a processing of at least one data stream associated with at least one device to cause, at least in part, an extraction of one or more data sets. The apparatus also comprises means for determining one or more arbitrary events data sets from among the one or more data sets based, at least in part, on a coincidence of the one or more arbitrary events data sets with at least one location-based display. The apparatus also comprises means for determining one or more information placement parameters for the at least one location-based display based, at least in part, on the one or more arbitrary events data sets.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2B is a diagram of the components of an archetype platform determines user archetypes, according to one embodiment;

FIG. 7A is a diagram of an exemplary system set-up for system 100, in one embodiment;

FIGS. 8A-8D are diagrams of user interfaces for devices interacting with location-based displays as utilized in the processes of FIG. 3, according to one embodiment;

DESCRIPTION OF SOME EMBODIMENTS

Examples of a method, apparatus, and computer program for determining performance of location-based displays are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
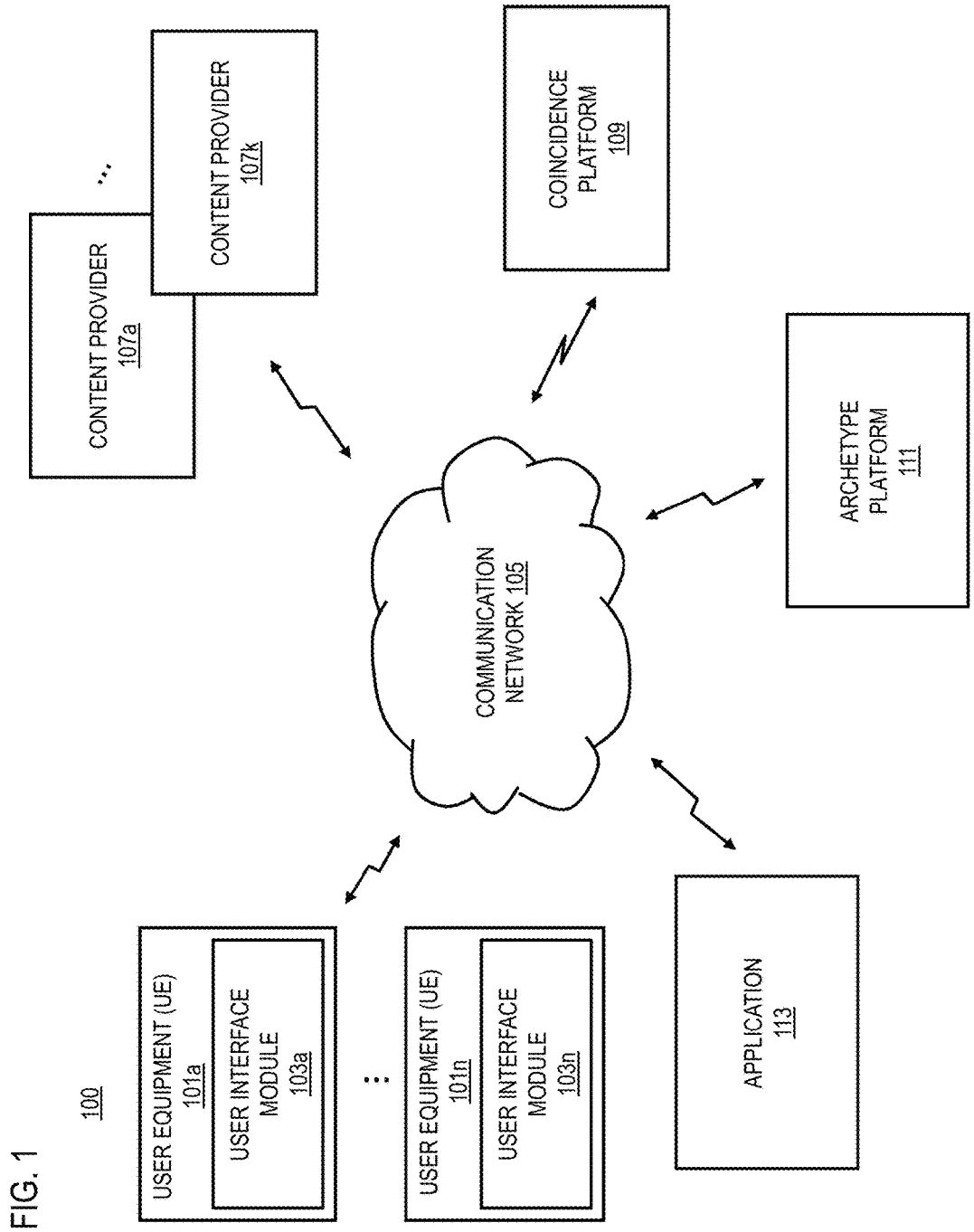
FIG. 1 is a diagram of a system capable of determining performance of location-based displays, according to one embodiment.

FIG. 1 is a diagram of a system capable of determining performance of location-based displays, according to one embodiment. Service providers and device manufacturers are challenged to deliver value and convenience to consumers. While use of mobile devices for navigation and web browsing is widespread, users rarely click on advertisements on their mobile devices. Therefore, one area of interest has been the development of tailoring content distribution to user context and/or interest, or building a connection between users' mobile devices and real-life out of home content on out of home assets, such as billboards. At present, advertising management for the out of home assets, however, may have little relevance as to the effectiveness of the out of home assets or whether users are interested with the advertisements on said assets. The advertising management may indirectly determine that sales have increased for products advertised, but such analysis may take weeks and connections between user actions and advertisements may be mere references or immediate. As a result, content providers face significant challenges in determining user context and interest in distributed content and when distributing content tailored to user context and/or interest.

To address this problem, a system 100 of FIG. 1 introduces the capability to determine performance of location-based displays, according to one embodiment. Location-based displays may include content that is bound to specific geographic locations. For example, an out of home advertisements are location-based displays because they display content specific to the particular location of the out of home asset. Performance of location-based displays may include user response to the displays. For example, users may react immediately in stopping to look more closely at displayed content, look up more information relating to displayed content, or act on the information. For instance, making a purchase of a product shown as part of displayed content may be acting on the information. The system 100 may provide a mechanism to determine the factors that coincide in order for users to respond to location-based displays and therefore improve targeting of displays to users. In one embodiment, the system 100 may provide the mechanism in real-time so that content distribution may always be optimized to display content that a user is likely to respond to.

In one embodiment, the system 100 may optimize location-based display content from a remote backend, for example, a remote server. For instance, the system 100 may determine an out of home asset, such as a billboard, "A" displaying advertisement "A," aggregate some user interaction regarding advertisement "A" at the location of said out of home asset "A," and aggregate performance information for displaying advertisement "A" at said out of home asset "A." Then, the system 100 may switch to displaying advertisement "B" on said out of home asset "A," aggregate user interactions relating to advertisement "B" at the location of said out of home asset "A," and determine performance information for displaying advertisement "B" at said out of home asset "A." By comparing performance information, system 100 may build an understanding of the relationships between users, locations, and displayed content that permits the system 100 to generate information placement parameters tailored towards selecting display content and/or display locations that are optimal for users frequenting specific locations.

In other words, system 100 may enable A/B testing architecture that is extremely valuable to targeting location-based displays in that the testing offers instantaneous and exploratory, short-term and tactical, medium-term and strategic, as well as long-term and systemic feedback for content providers. A/B testing may include experimenting with variants, for instance, "A" and "B", while holding other variables constant, as in the previously discussed scenario regarding comparing the performances of advertisements "A" and "B" at said out of home asset "A." Instantaneous and exploratory information may include switching displays in real-time and performing for instance, A/B testing, to measure and optimize instant performance of displays at particular locations. The rate for switching displays may take into account the speed that humans may comfortably take in new information, lest neither displays are effective due to human confusion at displays switching too fast.

Short-term and tactical information may include media companies looking at analytics on a subday, daily or weekly basis and allocating funds for distributing display content depending on where performance increases or falls within the said periods. Medium-term and strategic information may involve brands, media companies, or display location providers looking at broader trends in terms of location, time, and performance, and determining how to best allocate budgets in light of respective and/or conflicting requirements. Display location providers may include, for example, owners of display space. For instance, an owner of a cluster of out of home assets, such as billboards, may be a display location provider. In this treatment, we broaden the use of the display location provider term to incorporate the use of agents, in the form of a media or other company, to the same effect. In one instance, long-term and systemic feedback may include the display location providers or other agents looking at long-term trends to determine how to maximize returns on additional investment. For example, display location providers may contemplate renovations, enlargement, and/or digitization possibilities at existing display locations. Additionally, display location providers may observe returns on assets over the lifetimes of existing display locations, without additional investment, and decide whether or when to invest in installing new assets to boost revenue, or alternately refrain from investing and therefore cut losses.

To provide these services, the system 100 may synthesize user intents in real-time. In one embodiment, user intents may include abstractions detailing actions relating to a user's response to a location-based display. To determine user intents, the system 100 may gather various arbitrary data streams, for instance, data streams collected from social networking sources including Twitter, Facebook, LinkedIn, etc. The data streams may be arbitrary in that they may be unrelated or their relationships may be unclear. The data streams may also include data for routing, guidance, traffic, or transport service, for example, models and updates on traffic patterns, navigation tools, possible routes, etc. In one embodiment, these data streams may be related to various user devices and/or users. For example, the system 100 may determine data streams from Twitter as being related to a particular user or posted from a particular user device. By finding overlaps (or coincident data) in the data streams that coincide with location-based displays, the system 100 may determine user intents. User intents may be characterizations of user motivations in performing an action. For instance, the system 100 may determine that a Twitter post and a Facebook post both relating to a movie. The system 100 may also determine that a bus stop is displaying an advertisement for the movie. Then, the system 100 may infer that the movie advertisement is related to the postings and aim to determine combinations of factors that may have contributed to the users making the postings with respect to the movie advertisement. Such combinations of factors may characterize user intents. One example involving traffic services may including noting that the Twitter post and Facebook post coincide with peak traffic times, for instance, rush hour when buses are running most frequently. This may increase the likelihood that the post was made after a user saw the advertisement at the bus stop. Then, the system 100 may factor this information into determining user intents.

In a further embodiment, system 100 may bind real-time intents to behavioral models and/or behavioral data gathered from arbitrary real time data streams. Behavioral models may include previously determined models regarding user behavior. For example, "users that share data often share data in multiple ways" may be one behavioral model. Behavioral data from data streams may include where the system 100 may first extract data sets from arbitrary data streams and then decipher behavioral habits from the data sets. In a further example, they system 100 may take behavioral data into account by binding coincident arbitrary data to behavioral data. For example, behavioral data may indicate that users ages 18-25 often buy or try new soft drink flavor. Arbitrary data streams may show user purchase of a soft drink in a new flavor and existence of an out of home asset promoting the new soft drink flavor. Then, system 100 may determine that the intent showing some user interest in a new soft drink is coincident behavioral data for users ages 18-25.

The behavioral models may be in addition to or part of archetypes. Archetypes may include, for example, characterizations of users. For example, the system 100 may process coincident data to find social, emotional, and psychological factors that may describe users. For instance, one set of archetypes may be based in the degree of need to share, as felt by different users. For example, one group of users, "Group 1", may enjoy sharing information as a function of their social context, for emotional satisfaction, or psychological concerns. For instance, Group 1 may be in a social context where privacy is not too much of a concern. Unlike another group of users, "Group 2" who may want to keep a separate, private sphere of identity, Group 1 users may predominantly function in an environment where separations are not so clear. Emotionally and psychologically, Group 1 users may face more uncertainty that causes them to seek validation. This collection of social, emotional, and psychological inferences may form an archetype. When these factors are expressed as actions, the system 100 may determine behavioral models. For example, the characterizations in conjunction with operations may lend insight into behavioral models. For instance, the social, emotional, and psychological factors combining relative lack of concern for privacy and need for validation may cause Group 1 users to post content on social networks in greater quantities than users in other age groups. This combination of a characterization of a user type may be comprise an archetype. It is understood that users may move or shift between archetypes, fluctuating their behavior such that their behavior appears to conform to more than one archetype. A user's archetype may be fluid and it may fluctuate with time, context, and situation.

Behavioral models may or may not be related to archetypes. The previous example regarding teenagers is tied to an archetype, while a behavioral model may also state a general heuristic for how most users behave. For example, a behavioral model may state that social networking posts are often clustered in terms of time, meaning once a user posts, several posts may follow in quick succession. However, if the user does not post for a week, he is unlikely to post for a few weeks. Such a behavioral model is not directly associated with a specific user archetype.

In one embodiment, these associations permit system 100 to then determine placement parameters for location-based displays. For instance, placement parameters may include data permitting the system 100 to match characteristics of particular displays, with users that may be interested in the displays. For example using the previous example with soft drinks, placement parameters may indicate that a display on new soft drinks is relevant for young users. Then, the system 100 may determine that placement parameters reflecting young neighborhoods is more suitable for the soft drink display than parameters describing a more middle-aged or elderly population. In other words, in binding data from arbitrary data streams, positioning service, location-based displays, and/or behavioral models, the system 100 may determine user intents with high sensitivity to the current or expected context surrounding the effectiveness of displayed content.

To continuously sharpen its understanding of user intents and resulting information placement parameters, the system 100 may further analyze, for instance, view-through and click-through ratios. Ratios may indicate gradients for view-through and click-through rates. View-through rates may include the numbers of response after a user views a location-based display. Responses may include operations, for example, posting on social networks or initiating a purchase. Click-through rates may include rates at which users click on renderings to find additional information. In determining these ratios, the system 100 may analyze the success of content display with respect to its particular location. For example, displays that appeal to residents in a retirement community may differ from those that receive great responses when placed in an elementary school district. In other words, the system 100 may determine display performance from the perspective of the display relative to "landmarks," or the location at which the display is shown.

In a further embodiment, the system 100 may form a normal distribution from of the coincident data sets in relation to operations. In one embodiment, coincident data sets may refer to data sets of arbitrary events. For example, arbitrary events may include coincident occurrences of causal and non-causal events, meaning, for instance, the intersection of events that creates a certain outcome. In one embodiment, the system 100 may further determine outliers or find data points that fall out of the normal distribution, for example, outliers. In one embodiment, the system 100 may determine placement parameters based on the outliers. For instance, these outliers may permit particular insights characterizing a particular user or device. For instance, the system 100 may observe that most users pass by an advertisement on the side of a building without stopping. The system 100 may then find that one particular device appears to pass the advertisement, backtrack to a position immediately proximate the advertisement, then stay in the same position for 20 seconds. Such behavior may be an outlier that the system 100 may note as a focal point of the device. In one embodiment, focal points may connote particular interest or particularly strong ties between the device (or user associated with the device) and displayed content, in the context of temporal and spatial factors. The focal points may be used as starting points in testing models for determining information placement parameters. For instance, a user may be particularly interested in the content of an advertisement, but not have time to look at it closely because the advertisement is on an out of home asset along a freeway (a spatial factor) or because the user is rushing to work (a temporal factor). Alternately, a user might be only moderately interested in the content of an advertisement, but pause and look at it longer because the advertisement is located in a calm, vacation setting during a weekend. Alternately, a user might be only moderately interested in the content of an advertising, but pause and look longer at the same advertisement originally experienced in another location and another time, because the user is temporarily in a calm and unhurried situation. However, all scenarios may be helpful to determining information placement parameters. The system 100 may find focal points to find the circumstances that cause a user to act on seeing a location-based display.

In one embodiment, such analysis may permit the system 100 to provide immediate analytical feedback per "landmark" to calculate performance for a particular display. For example where the display is an advertisement, the performance may be real-time, immediate analysis for the advertisement or an analysis of the entire campaign. In another embodiment, the system 100 may permit seamless integration of data from out of home ads and location context relevant to users. For example, as users pass a display, the system 100 may determine that the user is proximate the display and present display-related content to the user on the user's mobile device. For instance, as a user stands near an out of home asset displaying a movie campaign, the system 100 may initiate a display for movie ticket vouchers. In another embodiment, the system 100 may indicate performance levels of location-based displays with respect to target business models, for instance, desired goals for profitability, margins, and/or elasticity of demand. For example, system 100 may prompt a change in displays if location-based displays are falling short of target goals and extend the length of display for displays that exceed or meet target goals.

As part of the calculation process, system 100 may further analyze suppression data, for instance, how often and in which location, are location-based displays suppressed from being able to interact with devices. In other words, suppression data may include data describing circumstances where devices are prevented from interacting with location-based displays. Such circumstances may include device limitations or limitations of the device relative to the location-based display, rather than lack of user interest. More specific circumstances include where a device is not in proximity to a participating location-based display format. For example, there is some technical incompatibility preventing the device from interacting with the display. Alternately, a device may not be within a visibility radius of a location-based display. For instance, the device is out-of-range for an interaction when taking into account the direction of travel of the device and/or mode of transport for the device. For instance, a device may pass a location-based display too fast for the two to interact. Visibility radius may refer to a user visibility radius, for instance, a user did not see a location-based display in time to initiate interaction. Alternately, visibility radius may refer to visibility of a device. For instance, a device may have issues interacting with a display when it is outside of a particular range of distance. Other instances of suppression data may include circumstances where the display for a location-based display has expired, so the display is no longer being shown, a device is turned off or a device has switched off a function that permits device interaction with location-based displays, or the device is disconnected from data or global positioning service (GPS) capability.

Furthermore, suppression data may characterize situations interaction between users and a location-based display may be lacking, not because a user is not interested, but because the user must concentrate on something else. The system 100 may include a suppression mechanism to prioritize user or navigator safety based on contextual parameters. For example, the suppression mechanism may include a location-based display suppression mechanism logical framework that prevents or delays the device interaction with location-based displays when certain contextual parameters are detected. In one scenario, the contextual parameters may represent scenarios where user safety is at risk or where distractions to a user should be minimized. One such case may be where a device is maneuvering in an area that requires more focus or concentration, for instance, while a device is traveling along a new road or a user is on a railway platform or tram crossing. Another such case may be where a device is in an area that requires more situation awareness, for example, while entering a busy junction, roundabout, merging lanes, parking, and/or watching for pedestrians.

In a further embodiment, the system 100 may further bring users into local business contexts via recommendations to users. For example, system 100 may determine routes, route traces, and/or geo-tags associated with users and user devices, and offer recommendations regarding sale opportunities that are along or proximate the user's determined, regular routes. Recommendations may further take into account user shopping lists, interests, calendar events, etc. For instance, the system 100 may determine that a user's birthday is coming up and recommend sales at a store that give particular promotions for customer birthdays. In other words, the system 100 may provide a "universal display list" for any determined habits of users. In one scenario, the routes may be seen as habits of users.

In yet a further embodiment, the system 100 may include the capability to collect location-based displays to devices. For example, users may not remember advertisements they see while traveling from point A to point B. In one embodiment, system 100 may allow devices to store displays or renditions of location-based displays suited for the particular devices. Then, the system 100 may provide a repository that a user may later access to redeem offers of learn more about the displayed content. As with previously described operations, users may save, interact with, and/or delete saved renditions of displays. In other words, the renditions may "mirror" the location-based displays on mobile devices. For example, system 100 may include a visibility framework with awareness of different location-based display format types, location-based format shapes, and contextual parameters. In one scenario, the visibility framework may include a spatial visibility framework that determines and uses the spatial characteristics of a location-based display. For example, location-based format types may include traditional formats, digital formats, scrolling displays, indoor billboards, outdoor billboards, holographic, etc. Location-based display format shapes may include shapes like board, panel, kiosk, pillar, bus stop shelter face, public toilet, wall, window, taxi sign, etc. Contextual parameters may include distance to the location-based display, time displayed in real world, time displayed as seen by user, weather, average speed of device, speed and/or direction a device is traveling, mode of transport, user preferences, social networking preferences, proximity of device to other devices, device orientation, etc. The system 100 may, for instance, create a presentation on a user mobile device based on an analysis of these factors.

Saving the renditions of displays may include, for example, allowing a user to peruse and interact with a list of the renditions. For example, the renditions may include all the advertisements a user passed during a journey. These may include all advertisements or displays that the user was immediately proximate to during or after her journey, whether or not the user saw or interacted with her device in passing these advertisements. In other words, the renditions may be generated based simply off of the displays being offered to the user at some time and space during her journey. She may or may not have actually seen or interacted with the displays. For instance, the user may collect a whole set of displays or advertisements on her mobile phone during her work commute. She may not interact with the collected set of displays immediately, either for example, for lack of interest, because she was occupied, or because of the suppression mechanisms. When she has time, she may then access and peruse the collected displays. In other words, the user may access the content of the location-based displays at a time or place convenient for them.

In one embodiment, the system 100 may include a user interface where the rendition of the display is shown to the user as a banner on her device home screen. In one instance, a user may click on the banner to prompt showing of supplemental materials relating to the display. For example if a display is an advertisement, supplemental material may include an overview of an offer in the advertisement, an offering of actions, promotional material, and/or more detailed information. An overview of an offer may briefly describe a product or service offered by a company or vendor. An offering of actions may include options to call a store, open a website, and/or navigational information directing a user to the nearest location where a product or service is offered. Promotional material may include special deals or discounts and more detailed information may include, for instance, a movie trailer if an advertisement is related to a new movie.

As shown in FIG. 1, the system 100 comprises a user equipment (UE) 101*a*-101*n* (or UEs 101) having connectivity to user interface modules 103*a*-103*n* (or user interface modules 103), content providers 107*a*-107*k* (or content providers 107), a coincidence platform 109, an archetype platform 111, and an application 113 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the user interface modules 103 may provide information regarding operations in conjunction with the UEs 101. For example, operations may include, for instance, users viewing displays, clicking parts of displays, queries related to displays, user prompts relating to display content, storing displays, etc. Furthermore, the user interface modules 103 may interact with the application 113 to initiate prompts and content display. In one embodiment, the user interface modules 103, content providers 107, and/or application 113 may work together to determine renderings of location-based displays on UEs 101. For example, content providers 107 may prepare a scaled down version of a location-based display that fits the screen of a UE 101a. In one embodiment where content providers 107 do not already have a version of a location-based display fitting for a user interface, application 113 may create a rendering, for example, using image recognition. Then, the application 113 may employ text recognition to make portions of the created rendering interactive. For instance, a user may point her device at an advertisement and capture an image of the advertisement or a portion of the advertisement. Application 113 may then query databases for content related to the captured image or cobble together images related to the advertisement to render a user interface containing information from the advertisement. For example, for a movie advertisement, application 113 may find images on the internet that are similar to the movie advertisement and first generate a rendering of the movie's promotional poster on the user's device. Then, the application 113 may make parts of the poster rendering available for user interaction, where a user may click on an actor to find more information on the actor or click on the movie name to find theatres where the movie is playing. The application 113 may then feed information on user interaction with the rendering from user interface module 103, back to the coincidence platform 109 and archetype platform 111 for analysis of user intents and finding of focal points.

In one embodiment, the content providers 107 may provide displays and/or supplemental displays. For example, content providers 107 may include databases of content items, for instance, advertisements. The content providers 107 may further include information on content characteristics, for instance, demographics that content is targeted to, length of display, display type, etc. Demographics may include a particular audience base, for example, "parents" or "students" or "luxury consumers." Length of display may include a length of time that a display is expected to run. For example, a holiday display may run in the weeks preceding a holiday or a movie advertisement may run in the first two weeks that a movie is in theatres. Display type may include whether a display is a video or a print display. For example, some displays are short clips of video that play on repeat while print displays are basically posters. Content providers 107 may provide content as well as descriptive characteristics regarding the content, for instance, categorizations pertaining to the content. For example, a content item consisting of an advertisement for a Christmas show may have a temporal categorization for the month of December and a spatial categorization that puts the advertisement in the town where the show is being performed. Then, the content providers 107 may also have parameters for the actual content item, for instance, the Christmas show advertisement may have a temporal parameter of December 10-December 25 and a spatial parameter for a cluster of out of home assets 5 miles from the theatre where the show is performed.

In one embodiment, the coincidence platform 109 may determine coincident data sets among various arbitrary data streams. For example, the coincidence platform 109 may determine one data stream conveying location information associated with a UE 101a and another data stream conveying location information associated with a UE 101b. By extracting data sets from these two data streams, the coincidence platform 109 may determine that some data points within these two data sets overlap. For example, UE 101a and UE 101b have both been to a location "A" and location "B," whereas only UE 101a has been to location "C." Then, coincidence platform 109 may recognize location "A" and location "B" as part of a coincident data set. In one embodiment, the coincident occurrence of casual and non-causal events is based on coincidence with a location-based display. For example, location "A" may be a bus stop with a display while location "B" is merely a residential building that does not have any displays. Then if coincidence platform 109 is determining coincident data sets based on coincidence of coincident data sets with a location-based display, coincidence platform 109 may determine a set comprised only of location "A."

In another embodiment, the coincidence platform 109's extraction of data sets and/or determination of coincident data sets may be based on knowledge extraction, contextual experience extraction, data models, processing models, or a combination thereof. Knowledge extraction may include, for example, information regarding the actual content of the data sets, or separating meaningful content from other content in a data set. For instance, a Facebook post may reads, "Joe's Diner is great!" Knowledge extraction may pinpoint "Joe's Diner" and "great", while discarding "is." Contextual experience extraction may include, for instance, background information on the data that may give meaning to the data. For example, if a user follows the post with an emoticon for anger or sadness, contextual experience extraction may determine that "great" may be sarcastic in this context. Data models or data normalization processing models may include functions or patterns along which data is expected to fall. For example, the coincidence platform 109 may consider the normal distribution or probability of coincident data points, versus run-outs. In one scenario, run-outs may include information that cannot be explained by data models or functions. These may be outliers and exceptions. The coincidence platform 109 may collect the coincident data sets to form areas of coincidence. Areas of coincidence may describe cross-sections of data that may begin to describe categories of behavior or categories of users that gravitate towards particular behavior.

In one embodiment, the coincidence platform 109 may further determine operations performed by UEs 101, where the operations are in contextual proximity to coincident data sets and/or location-based displays. For example, operations may include viewing, clicking, storing, sharing, from a device. In one scenario, viewing displays may include an operation where a user points his UE 101a at a location-based display, causing an interactive version of the location-based display on his own UE 101a. Operations in contextual proximity to coincident data sets and/or location-based displays may include operations that take place near the areas of coincidence. Contextual proximity may include, for instance, temporal proximity, spatial proximity, and/or activity proximity, with the coincident data sets or location-based displays. In one scenario, temporal proximity may include an event occurring close in time to another event. One such case may include where the coincidence platform 109 may determine that an operation such as, purchasing a product, took place within minutes of coincidence between a user device at location "A" and a display of an advertisement for the product at location "A." An example of spatial proximity may include an operation being near a location-based display. Activity proximity may include a user performing several operations (tweeting, posting on Facebook, texting) shortly after passing an advertisement.

Alternately, one data set may include purchase information for purchases conducted via UE 101a. The coincidence platform 109 may determine that purchase information for product "A" is coincident UE 101a being at location "A." Additionally, the coincidence platform 109 may determine that the operation where the user initiated purchase is temporally proximate data showing actual purchase of product "A" and the UE 101a being at location "A." Then, the coincidence platform 109 may infer some connection between the purchase conducted by the user of UE 101a and location "A."

In one embodiment, the archetype platform 111 may determine archetypical information and/or behavioral models based on the coincident data sets and/or operations to help determine information placement parameters. In other words, the collective analysis of the intersections between operations, coincident data sets, and/or location-based displays may help construct the relationship between various types of users and their reactions to different displays. For example, the archetype platform 111 may deduce archetypal information and/or behavioral models by constructing a normal distribution of coincident data sets relative to the operations. The archetype platform 111 may further determine outlier areas of the normal distribution. For example, a normal distribution may show a high density of cars moving past a location-based display on a daily basis. However, on one day of the year, no cars might pass the location-based display, although the same number of UEs 101 are observed to pass the location-based display. Such a day may be an outlier. Then, information placement parameters may be based on the normal distribution and/or the outlier areas.

In one embodiment, the archetype platform 111 may further take into account positioning data from map content information, location-based services, or a combination thereof. Positioning data from map content information may include information on traffic patterns or common routes, for example, public transportation routes. Location-based services may include navigation, routing, or transport services. These services may include maps that give directions or provide information on scheduled transport options, for example, giving timetables or possible delays.

Put another way, the coincidence platform 109 may determine areas of coincident data, or areas where data sets contain the same, similar, and/or related data. In one embodiment, areas of coincident data may include events, for instance, user operations. For example, an event may include an operation like a user posting an update on a social networking site. Then, the coincidence platform 109 may determine temporal and spatial coincidence related to the event. For example, the coincidence platform 109 may determine that various posts on a particular social networking site were all posted at the same time, from approximately the same location. Then, archetype platform 111 may connect the temporal and spatial coincidence information related to the events, with customer archetypes. For example, high school students may tend to post on social networking sites around 4 pm, when they finish school. The archetype platform 111 may determine the temporal and spatial information relating to a posting and deduce that a posting detected around a certain time and location, was likely posted by a high school student.

The coincidence platform 109 and archetype platform 111 working in conjunction create models that represent couplings of subjective and objective user preferences informed by customer archetypes, as well as patterns underlying user behavior. Subjective user preferences may include characteristics specific to users. For example, user "A" may be interested in an advertisement, but he may not express his interest by posting on a social networking site about the advertisement content. Alternately, user "B" may be interest in the advertisement to the same amount as user "A" and immediately post on a social networking site about the advertisement content. Objective user preferences may include the inference that posting on a social networking site is an expression of user interest or preference for content in the posting. Coupling subjective and objective user preference may include determining various aspects or factors that influence user preference expressions of user preference. Archetypes are important in coupling subjective and objective user preference since they may give the context for deciphering preferences. For example, archetypes may show that very young children may not post on social networking sites, regardless of their preferences or interest levels, while tweens may post on social networking sites even when a topic is only marginally interesting to them. Without archetypes, connections made between subjective and objective preferences could be led off-track. Archetypes therefore give a framework with which to more accurately couple subjective and objective preferences. Patterns underlying user behavior includes individual users and collective users. For example, collective users may include a first user and users socially connected to that first user. In one scenario, patterns underlying the behavior may include routes or commute updates created by a first user.

In observing arbitrary events in conjunction with elaborating on user archetypes, system 100 builds an understanding of the intersection of social, emotional, and psychological aspects of customer experiences that contribute to event occurrence. For example, system 100 may continually process temporal and spatial information related to events. To replicate the event, the system 100 may create and continually refine information placement parameters to associate displays that fit the information placement parameters, with various locations. In one embodiment, the models are trainable to mitigate contextual fluctuations and undesirable outliers. For example, a natural disaster in an area may drastically impact the accuracy of a model. Continuous processing of the model may train the model to adapt to the sensitive context of a location for a display, as the location is recovering from the natural disaster. For example, the system 100 may withhold location-based display updates, for instance, updates from a real time feedback loop provided by a remote backend like a remote server. For example, the system 100 may suppress a subset of a set of data where a known exception may affect the data and resulting computations. For example, a holiday where some roads are closed may cause the system 100 to stop the holiday data streams from impacting the model. Then, the data can be regionally shared and adjusted by content provider needs. For example, data can be horizontally partitioned across a particular time to answer the needs of a content provider. For example, an advertiser may have temporal and spatial parameters in mind for content she wants displayed. Then, the system 100 may determine where the content should be displayed to perform most effectively, given the temporal and spatial preferences of the advertiser.

In one embodiment, the coincidence platform 109 and archetype platform 111 may perform the calculations where each of the data streams are represented by random matrices of Gaussian distribution where deterministic matrices may match sensing phase transitions of the Gaussian distribution of deterministic matrices. In one embodiment, the Gaussian matrices may be formed such that any phase plane in any of the random matrices, exhibit coincidence. Specifically, the phase planes may exhibit temporal and spatial coincidence regarding event occurrence. Then, the system 100 may approximate the coincidence with deterministic matrices to construct a model for data that is trainable by simply replacing a phase plane. For instance, the system 100 may replace a phase plane in a situation where there is substantial context fluctuation, for example, a natural disaster or rapid urbanization.

To illustrate, system 100 may set "M1" as a social aspect, "M2" as emotional aspect, "M3" as psychological aspect, "M4" as behavioral aspect, and "M5" as a spatial (location) aspect. Future user experiences, are then $F_e$, where $P_i$=observations per data stream, and $F_e = P_i \{M1, M2, M3, M4, M5\}$, If the matrices are polluted, for instance, by causal information generated by users, an asymptotical phase transition boundary over Gaussian random matrices may restore the matrices to the necessary state. For instance, matrices may capture both causal and non-causal events. When the matrices and events become related to each other, system 100 may de-couple the matrices and make them orthogonal to restore the matrices. The system 100 may user the asymptotical phase transition for a cyclic ensemble during a training period for the model or while initiating model user without bootstrapping. For any sequence of linearly independent matrices $\{A(n \times N)\}$, the system 100 may recover the correct phase transition between the occurrences.

In one embodiment, the application 113 may serve as the means by which the UEs 101 and content providers 107 interact, with guidance from the coincidence platform 109 and archetype platform 111. For example, the application 113 may activate upon detection that a UE 101 is proximate a location-based display. Then, the application 113 may cause the UE 101 to stream data to coincidence platform 109 and subsequently engage archetype platform 111 to help determine content best suited for a particular location-based display.

By way of example, the UEs 101, user interface modules 103, content providers 107, coincidence platform 109, archetype platform 111, and application 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes typically occurs by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
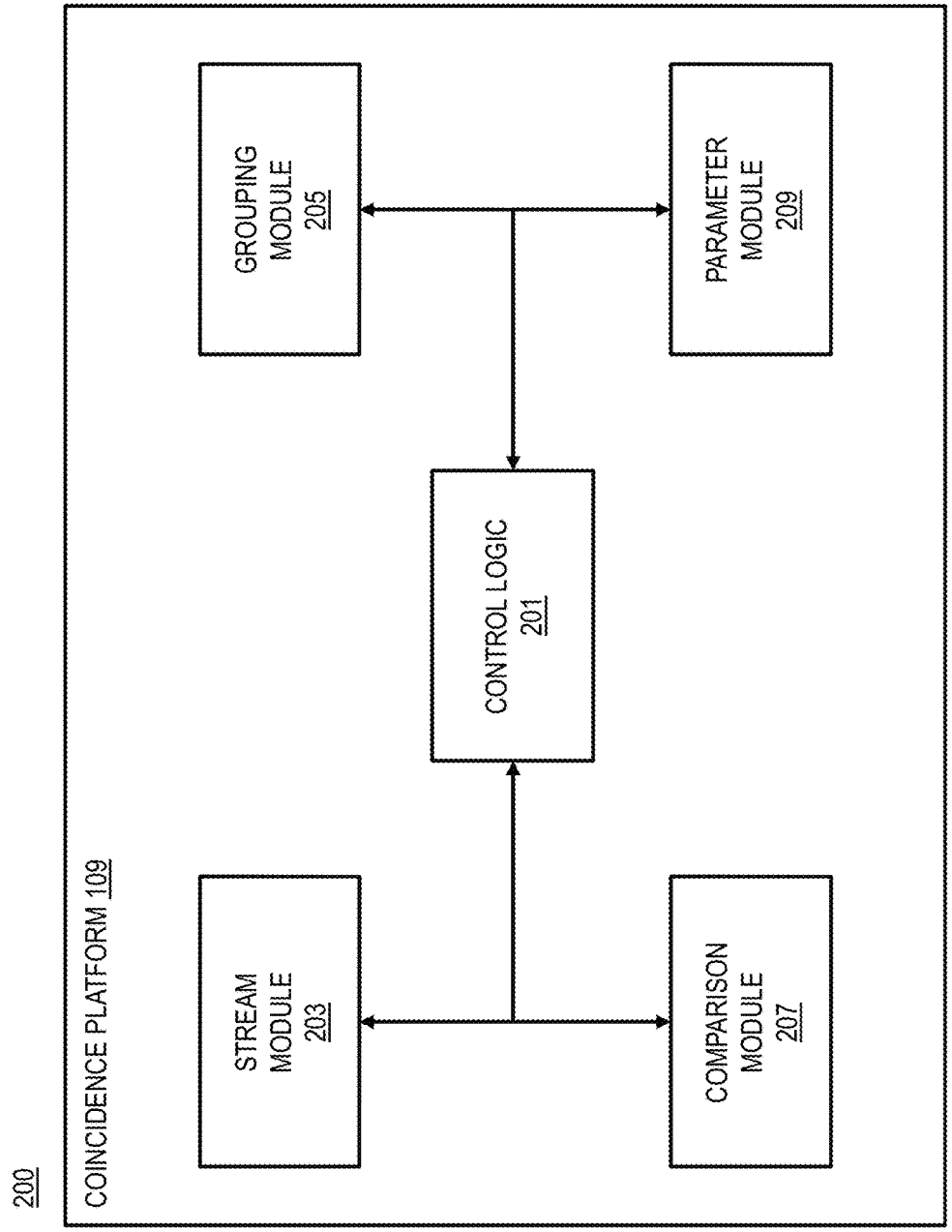
FIG. 2A is a diagram of the components of a coincidence platform that determines information placement parameters for location-based displays based on coincident data sets, according to one embodiment.

FIG. 2A is a diagram of the components of the coincidence platform 109, according to one embodiment. By way of example, the coincidence platform 109 includes one or more components for determining information placement parameters for location-based displays based on coincident data sets. It is contemplated that the functions of these components may be combined in one or more components or performed by other components of equivalent functionality. In this embodiment, the coincidence platform 109 includes a control logic 201, a stream module 203, a grouping module 205, a comparison module 207, and a parameter module 209.

In one embodiment, control logic 201 and stream module 203 may determine one or more continuous data flows. For example, map information and user mood information. In a further embodiment, the control logic 201 and stream module 203 may extract data sets from the data streams. In one embodiment, the control logic 201 and stream module 203 may further perform knowledge extraction, contextual experience extraction, extraction based on data models and/or data normalization processing models, or a combination thereof. For example, the control logic 201 and stream module 203 may process temporal and spatial data sets to determine that a device submitted a social networking while proximate an advertisement. Knowledge extraction may include determining the content of the post, for example, using text analysis to determine if the post is regarding content in the advertisement. Contextual experience extraction may include determining whether the post is interaction above a normal distribution. For example, a user may frequently post on things she sees during her after-work commute. The post would then not comprise interaction above a normal distribution. However, if the user rarely posts, the control logic 201 and stream module 203 may determine that the post is an exception and the user might be especially interested in the advertisement. Contextual experience extraction may also refer to providing context for knowledge extraction text analysis. For example, contextual experience extraction may include recognition of slang or differences in word usage with respect to user archetypes. For instance, "sick" in one context may show a user's approval of a product, while in another context, "sick" might mean poor health. Extraction based on data models may refer to the control logic 201 and stream module 203 relying on models to interpret data, discover coincidence, and/or initiate data extraction. Extraction based on data normalization processing models may include where the control logic 201 and stream module 203 decides and refines what data streams to collect, and of the data streams, which data streams are relevant for increased analysis.

Then, the control logic 201 and grouping module 205 may determine coincident data sets from the extracted data sets. In other words, the control logic 201 and grouping module 205 may group sets of data to define coincident data sets. The control logic 201 and grouping module 205 may further determine some relationships or characteristics describing the coincident data sets. For instance, the control logic 201 and grouping module 205 may determine the coincident data sets using knowledge extraction, contextual experience extraction, data models, or data normalization models. In one embodiment, the control logic 201 and grouping module 205 may see these relationships or characteristics as abstractions showing some underlying insight or theme as to how various data is related or may become related. For example, a UE 101a may be connected to an intersection of a data point, "3 pm," and another data point, "bus stop X." The control logic 201 may group the intersection together with other timings and other bus stops and eventually find that the set translates into a routine route traveled by UE 101a. On the other hand, a grouping that does not get reinforced by continuously received data from the control logic 201 and stream module 203 may cause the control logic 201 and grouping module 205 to infer that the coincident occurrence of "3 pm" and "bus stop X" is an exception for behavior of UE 101a. In one embodiment, the control logic 201 and grouping module 205 may further tie the coincident occurrence with events. For example, if an event is a blog post, the control logic 201 and grouping module 205 may determine temporal and spatial data associated with a blog post.

In one embodiment, the control logic 201 and comparison module 207 may determine at least one location-based display and compare data sets to find coincidence of coincident data sets with a location-based display. Continuing off the previous example, the control logic 201 and grouping module 205 may find the intersection of time, location, and an event while the control logic 201 and comparison module 207 may relate this intersection to a location-based display. For instance, the blog post may refer to a movie. The control logic 201, grouping module 205, and comparison module 207 may determine that the user was proximate an out of home asset for the movie a couple days prior to the blog post. In one embodiment, the control logic 201 and comparison module 207 may then form a connection between the blog post and the out of home asset for the movie. In one embodiment, the control logic 201 and comparison module 207 may account for contextual proximity of coincident data sets, location-based displays, or a combination thereof.

In one embodiment, the control logic 201 and parameter module 209 may then determine information placement parameters for the location-based display based on the coincident data sets. For example, control logic 201 and parameter module 209 may form categories or descriptions for relationships describing location-based display surfaces to better match content to the available display surface. For example, the control logic 201 may determine that many of the users that pass by a bus stop are university students, often that attend class either in the afternoon or in the evening. Then, control logic 201 and parameter module 209 may set parameters like "student," "young," "nearby university," "afternoon," and "night," as information placement parameters. Then, the control logic 201 may work with content providers 107 to determine content that is appropriate in light of the parameters so that content displayed on the bus stop location-based display can perform well.

FIG. 2B is a diagram of the components of the archetype platform 111, according to one embodiment. By way of example, the archetype platform 111 includes one or more components for determining user archetypes. It is contemplated that the functions of these components may be combined in one or more components or performed by other components of equivalent functionality. In this embodiment, the archetype platform 111 includes a control logic 221, an operation module 223, a distribution module 225, an archetype module 227, and an intent module 229.

In one embodiment, the control logic 221 and operation module 223 may determine operations performed by devices. For example, views, clicks, shares, etc. Views may include a user pointing his UE 101a to a location-based display to view a version of the display on the UE 101a. Views may also include a user performing some action relating to a display. For example, a view may include purchase information where a user purchases a product advertised on a display that the user was standing near. Clicks may include content related to a display that a user actually clicks on or interacts directly with. Shares may include content sharing related to a display. For example, a user may see an out of home asset displaying a campaign and create a post on a social networking site in response to content on the out of home asset. The control logic 221 and operation module 223 may determine possible operations performed by users on UEs 101, especially where operations may have some connection to location-based displays. In one embodiment, the control logic 221 and operation module 223 may contribute to calculation of view-through and click-through rates.

In one embodiment, the control logic 221 and distribution module 225 may aggregate coincident data sets relative to operations determined by the control logic 221 and operation module 223 to construct a normal distribution. For example, the control logic 221 and distribution module 225 may also determine outlier areas of the normal distribution.

In one embodiment, the control logic 221 and archetype module 227 may then determine archetypal information and/or behavioral models based on the coincident data sets, operation, or a combination thereof. For example, the control logic 221 and archetype module 227 may determine reference or baseline archetypes and behavioral models. One such scenario may include archetypes on social, emotional, and psychological ties cause coincident data. In a further embodiment, the control logic 221 and archetype module 227 may also define temporal and spatial windows and define archetype conditions relative to the windows. For example, a temporal and spatial window may be, "3 pm to 5 pm, bus stop A." During this window, archetype conditions might be most applicable and for high school students. However, a temporal and spatial window for "5 pm to 7 pm, bus stop A" may build an archetype condition more suited for working professionals. In one embodiment, the control logic 221 and archetype module 227 may further include positioning data, for instance, data from map content information and/or location-based services. These may include routes. For instance, an archetype condition might include information where students typically stop by a fast food vendor before returning home. Thus, the control logic 221 and archetype module 227 may include where students might be more receptive or pay more attention to advertisements after school as they are resting and socializing along their routes home.

In one embodiment, the control logic 221 and intent module 229 may determine user intents with respect to location-based displays. For example, the control logic 221 and intent module 229 may bind positioning data to archetypal information and/or behavioral models to determine intents characterizing the sets of factors contributing to user interaction with the displays, and therefore, high performance of the displays.

Figure 3:
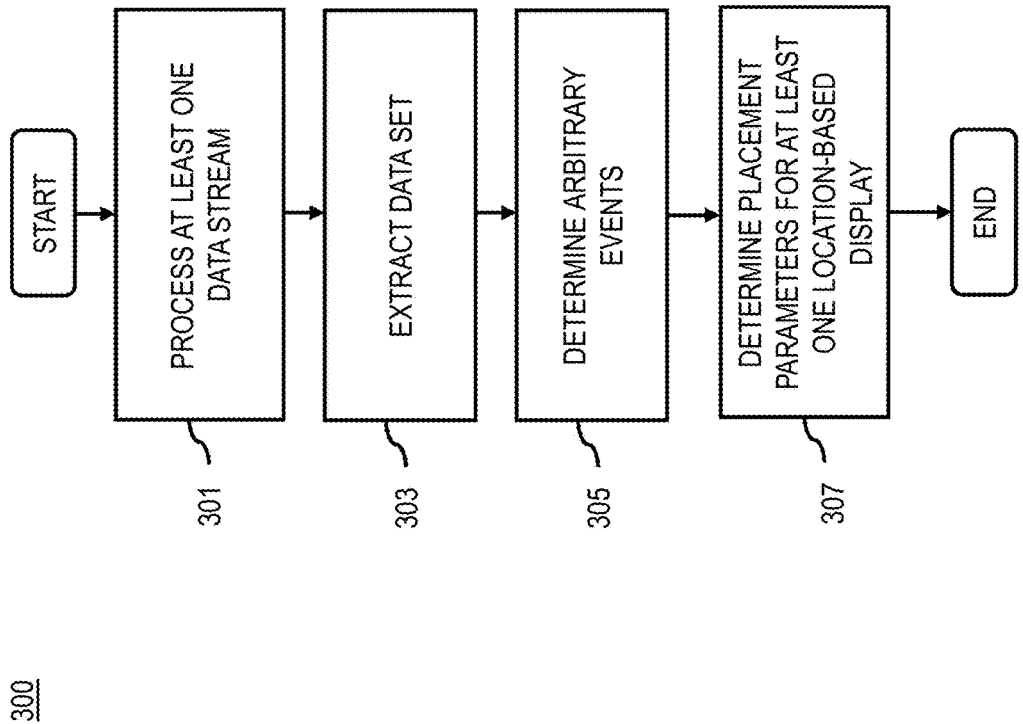
FIG. 3 is a flowchart of a process for determining performance of location-based displays, according to one embodiment.
Figure 11:
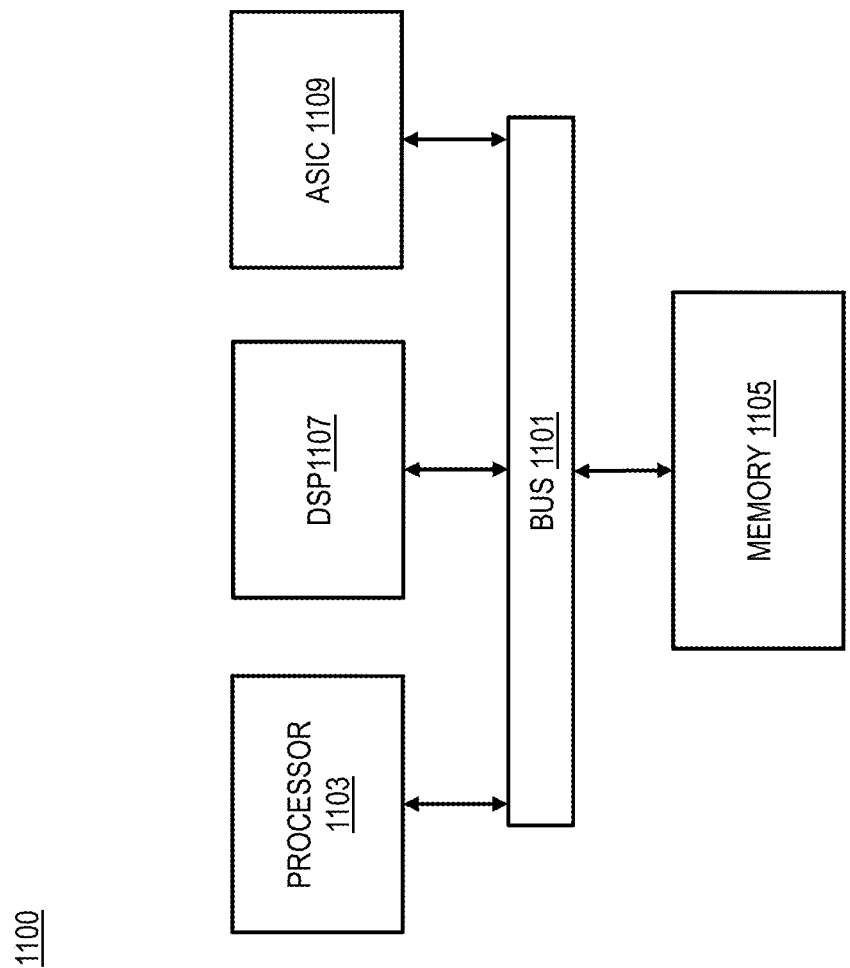
FIG. 11 is a diagram of a chip set that can be used to implement an embodiment of the invention.

FIG. 3 is a flowchart of a process for determining performance of location-based displays, according to one embodiment. In one embodiment, the coincidence platform 109 performs the process 300 and is implemented in, for instance, a chip set including a processor and a memory as shown in FIG. 11. In one embodiment, the control logic 201 may process and/or facilitate a processing of at least one data stream associated with at least one device to cause, at least in part, an extraction of one or more data sets (step 301 and step 303). For example, the control logic may perform step 303 wherein the extraction of the one or more data sets, the determination of the one or more arbitrary events, or a combination thereof is based, at least in part, on a knowledge extraction, a contextual experience extraction, one or more data models, one or more data normalization processing models, or a combination thereof. For example, determining arbitrary events may involve also extracting data enabling contextual understanding of the coincident data. Then, the control logic 201 may determine one or more arbitrary events from among the one or more data sets based, at least in part, on a coincidence of the one or more arbitrary events data sets with at least one location-based display (step 305). For step 307, the control logic 201 may determine one or more information placement parameters for the at least one location-based display based, at least in part, on the one or more arbitrary events data sets. In one embodiment, the control logic 201 may further determine the at least one information display based, at least in part, on whether the at least one information display is at least one focal point of the at least one device. As described above, the application 113 may also perform this step of determining an information display.

In one embodiment, control logic 201 may generate a copy of a location-based display to be shown on a UE 101. For example, the control logic 201 may further determine one or more location-based display formats. For instance, the control logic 201 may determine that a location-based display is an out of home, paper display on the side of a newspaper kiosk. That means its format is likely a rectangle of specific dimensions. Then, the control logic 201 may cause, at least in part, a presentation of the at least one location-based display on one or more device based, at least in part, on the one or more location-based display formats. In other words, the control logic 201 may receive information indicating that a user (and her device) is approaching the newspaper kiosk. Relying on a visibility logical framework, the control logic 201 may identify an advertisement on the side of the newspaper kiosk and generate a copy of the advertisement to display on the user's device. In a further embedment, control logic 201 may determine to store the presentation of the at least one location-based display on one or more devices for future access.

In another instance, the control logic 201 may determine at least one suppression parameter based on context information associated with one or more devices. As previously discussed, a suppression parameter may represent a scenario where displaying content on a UE 101 is not possible or not practical. For example, one suppression parameter may include where a location-based display is expired, so the control logic 201 may not generate a copy of the display for a UE 101 because there is no display. Another suppression parameter may arise where user context dictates that distractions may not be safe or preferable for a user, for example, when the user is at a crosswalk. In this case, the suppression parameter may contribute to the timing of presenting a location-based display to a user on his UE 191. For instance, the suppression parameter may suppress or delay presentation of a copy of a location-based display on a UE 101. In other words, the control logic 201 may determine an association between the at least one suppression parameter and the one or more information placement parameters for presentation of the at least one location-based display on the one or more devices. In one embodiment, the presentation of the at least one location-based display is displayed immediately for a user. In another embodiment, the presentation of the at least one location-based display is stored in a device, possibly for later access. For example, devices may store and thus compile a collection of location-based displays that a user might have been proximate to during a trip. In one scenario, the collection is generated upon user prompting. In another scenario, the collection is created without user interaction. In yet another scenario, the collection can be accessed or sorted based on a journey or time period associated with a user. Such cases may include scenarios similar to "Tuesday commute", "visit to City Z", or "walk to new restaurant."

Figure 4:
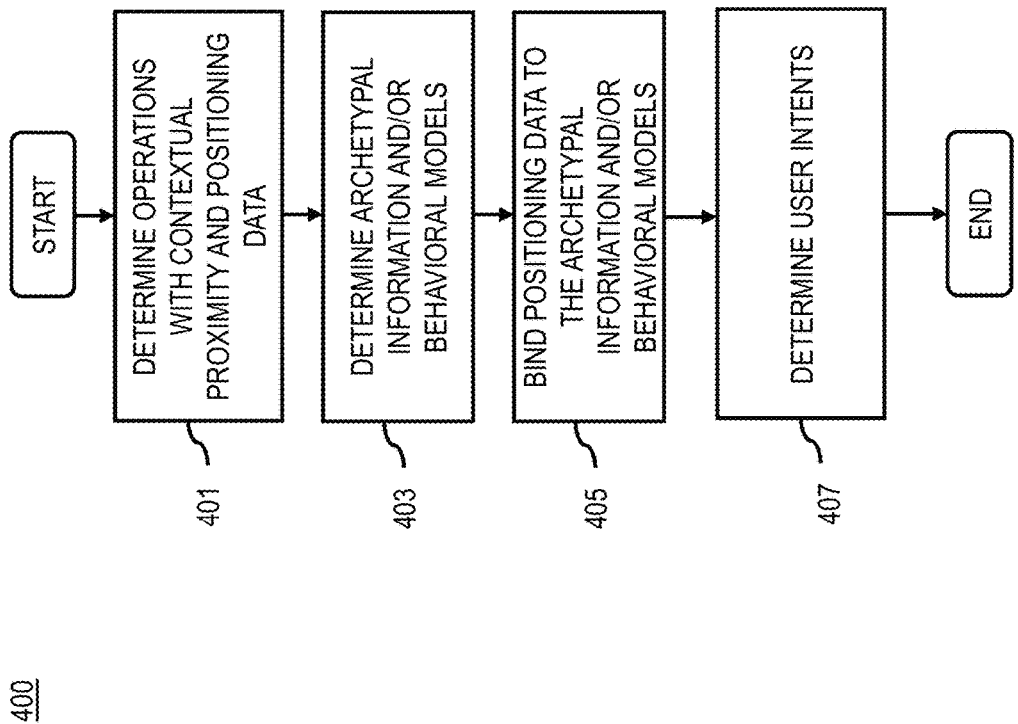
FIG. 4 is a flowchart of a process for determining archetypal information and/or behavioral models, according to one embodiment.

FIG. 4 is a flowchart of a process for determining archetypal information and/or behavioral models, according to one embodiment. In one embodiment, the archetype platform 111 performs the process 400 and is implemented in, for instance, a chip set including a processor and a memory as shown in FIG. 11. In one embodiment, the control logic 221 may determine one or more operations performed by the at least one device in contextual proximity to the one or more arbitrary events data sets, the at least one location-based display, or a combination thereof, wherein the one or more information placement parameters are further based, at least in part, one the one or more operations (step 401). For example, a user may purchase an item shortly after being proximate an advertisement relating to the item. In one embodiment, the control logic 221 may determine archetypal information, one or more behavioral models, or a combination thereof for at least one user of the at least one device based, at least in part, on the one or more arbitrary events data sets, the one or more operations, or a combination thereof, wherein the one or more information placement parameters are further based, at least in part, on the archetypal information (step 403). For example, the control logic 221 may determine process data wherein the at least one data stream, the one or more data sets, the one or more arbitrary events data sets, or a combination thereof include, at least in part, positioning data gathered from map content information, one or more location-based services, or a combination thereof. Then, the control logic 221 may cause, at least in part, a binding of the position data to the archetypal information, the one or more behavioral models, or a combination thereof to determine one or more user intents with respect to the at least one location-based display (step 405 and step 407). In one embodiment, the control logic 221 may further determine the one or more information placement parameters based, at least in part, on the binding, the positioning information, or a combination thereof. Alternately or in addition, the control logic 221 and control logic 201 may work together to determine the information placement parameters.

Figure 5:
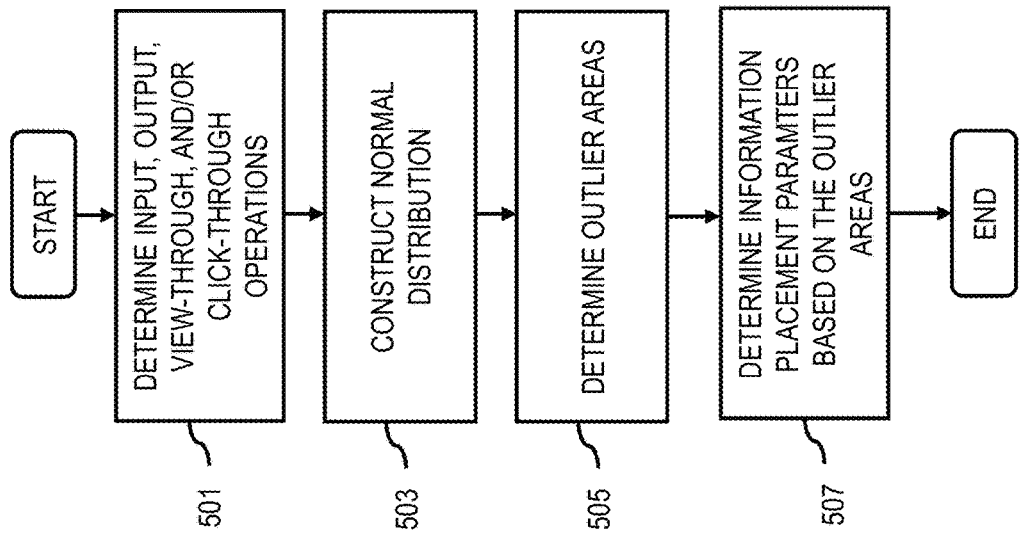
FIG. 5 is a flowchart of a process for normalizing data, according to one embodiment.

FIG. 5 is a flowchart of a process for normalizing data, according to one embodiment. In one embodiment, the archetype platform 111 performs the process 500 and is implemented in, for instance, a chip set including a processor and a memory as shown in FIG. 11. In one embodiment, the control logic 221 may cause, at least in part, a construction of at least one normal distribution of the one or more arbitrary events data sets in relation to the one or more operations, for example, wherein the one or more operations include, at least in part, one or more input operations, one or more output operations, one or more view-through operations, one or more click-through operations, or a combination thereof (step 501 and step 503). For example, the control logic 221 may determine times in a day when view-through operations occur as part of a normal distribution. In one embodiment, the control logic 221 may then determine one or more areas of the at least one normal distribution, wherein the one or more information placement parameters are further based, at least in part, on the one or more outlier areas (step 505 and step 507).

Figure 6:
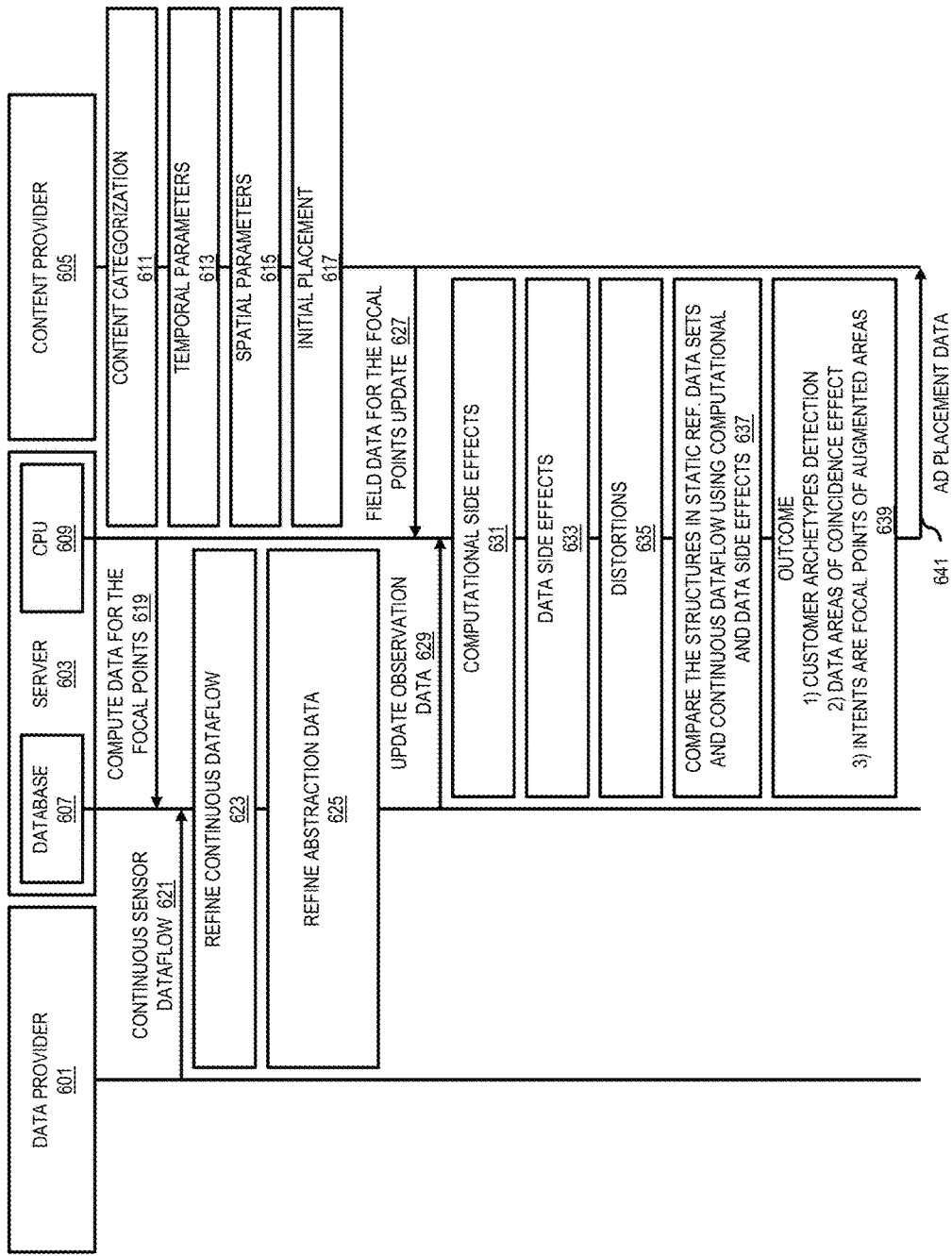
FIG. 6 is a signal diagram of a process for creating models to improve information placement parameters, according to one embodiment.

FIG. 6 is a signal diagram of a process 600 for creating models for to improve information placement parameters, in one embodiment. For example, the process 600 may include data providers 601, server 603, and content providers 605. In one embodiment, the data providers 601 may include end user sensors, for example, sensors associated with user devices. Data providers 601 may further include social networking, message posting, and/or image and video hosting services. In one embodiment, server 603 may include a database 607 and a central processing unit (CPU) 609 to save and process data from data providers 601. In one embodiment, content providers 605 may include advertisement providers that create or have content for display.

In one embodiment, the process 600 may compute an initial focal point to first start the model. For instance, content provider 605 may have information for a particular content item regarding a content categorization 611 for the content item. Content categorization may include an advertisement placement categorization, for example, where the content provider 605 expects for the advertisement to be displayed. For instance, an advertisement for a movie may be fitting in an urban area while the movie is available in theaters. Content categorization 611 may then place the movie in a category of short-term advertisements fitting for urban settings. In one embodiment, the content provider 605 may further have temporal parameters 613 and spatial parameters 615 specific to a particular content item. For example, content categorization 611 may have the general characteristics for a content item, whereas the temporal parameters 613 may include more detail. For example, a spatial parameter may include a specific location or street cross-section, while the categorization may simply be "urban." Similarly, a temporal parameter may include a period of hours, days, or weeks, while the category may simply be "short-term." From the content categorization 611 and specific temporal parameters 613 and spatial parameters 615, the content provider 605 may dictate an initial placement 617 from first focal points, either determined from models, assumptions, and/or previous knowledge.

Then, the server 603 may compute data for the focal points from initial placement 617. For instance, the CPU 699 may initiate communication 619 with database 607 to monitor the accuracy of the focal points. In one embodiment, the data provider 601 may send communication 621 to database 607, continuously transferring sensor data to the database 607. In one embodiment, the data provider 601, database 607, and/or CPU 609 refine the dataflow 623 and refine abstraction data 625. For example, refine the dataflow 623 may include considering a temporal buffer. For instance, users may not react exactly simultaneously to a content item upon seeing the content item. The delay may include human reaction time, or simply temporal factors that may affect interaction. For example, a blog post event may have a longer temporal buffer since drafting a blog post may take at least half an hour, whereas a social networking post may have a relatively brief temporal buffer because drafting the post is relatively quick. Temporal factors for saving, viewing, or searching for more details information regarding a content item may have an even shorter temporal buffer. The step of refining the dataflow 623 may account for factors that may contribute to the dataflow being a certain way. Refining the dataflow 623 may also include determining what data to receive, store, and process and what data is largely or increasingly irrelevant.

In one embodiment, the data provider 601, database 607, and/or CPU 609 may also refine abstraction data 625. For example, based on knowledge extraction, contextual experience extraction, data models, and processing models, the data provider 601, database 607, and CPU 609 may hone an understanding of what data means and how data might be related. For instance refining abstraction data 625 may normalize data from dataflows with areas of coincidence (between data sets). In doing so, refining abstraction data 625 may contribute to building associations between various dataflows to form an understanding of how and why one set of data may overlap with another.

From refining the dataflow 623 and refining abstraction data 625, the content provider 605 may send communication 627 to the CPU 609 to update focal points. The database 607 may also send communication 629 to the CPU 609 to update observation data. In one embodiment, updating observation data may include the CPU 609 accounting for computational side effects 631, data side effects 633, and distortions 635. For instance, computational side effects 631 may include low-level computational limitations regarding input or output operations during the computations. For example, limitations with speed or computing capacity. Data side effects 633 may include outliers or information about or explaining data. For example, the CPU 609 may observe whether groupings or trends in data are reinforced by observations in the abstraction data from the step of refining abstraction data 625. Data side effects 633 may include indications that previous models were wrong or inaccurate. For example, data side effects 633 may determine that observations are not outlier scenarios, but indications of different groupings or models. Distortions 635 may include may include distorted areas on continuous sensor data flow that makes up communication 621. For example, the distortions 635 may include data bias or issues where there are not enough data points to develop a theory regarding the relationships between data. In another embodiment, distortions 635 may indicate particularly strong groupings. For example, distortions 635 may show a combination of factors that creates a particularly strong connection between events, locations, and a location-based display.

In one embodiment, the CPU 609 may further compare structures in static reference data sets and continuous dataflow using computational side effects 631 and data side effects 633. For example, the CPU 609 may test the outlier model based on computational side effects 631, data side effects 633, and distortions 635 against a training data set. From this comparison, the CPU 609 may determine an outcome 637 including a detection of customer archetypes and data areas of coincidence. Overlaps are then intents, which may be taken as focal points. Focal points may then initiate a next round of training for the models so the process 600 continually builds higher sensitivity and accuracy in its determination of user intents. In one embodiment after determining and updating archetypes, knowledge about coincident data areas, and focal points, the CPU 609 may send a communication 639 to content provider 605 of generated placement data or updates to existing placement data. For example, communication 639 may update previously determined information placement parameters.

FIG. 7A is a diagram of an exemplary system set-up 700 for system 100, in one embodiment. In one embodiment, the set-up 700 may include data 701, where data 701 assembles or groups events to coincident data. For instance, Object->{Geotag, Motion, Movement, Time}. The set-up 700 aims to develop categorizations (including groupings) for collections of relevant objects and perceive changes in the categorizations over time. To do this, data 701 enters the occurrences mapper 703. The occurrences mapper 703 may run an algorithm in a "stream computation framework." This computation framework may take data streams from data 701 and map objects (including tweets, persons, places, etc.) to characterizations of context (including place, address, time, etc.). For instance, the occurrences mapper 703 may map tweets to places or addresses. Then, a processing elements (PE) interface 705 may update the dataset and structure used but occurrences mapper 703. In one embodiment, the PE interface 705 may hone associations made by the occurrences mapper 703 based on perceived transitions in data. For instance, temporal and spatial changes may be transitions in data. In one embodiment, the PE interface 705 observes the transitions in data by accessing a data collection 707. In one embodiment, the occurrences mapper 703 may further interact with occurrences index 709, where occurrences index 709 may be a database containing an index of objects keyed by relevant notions of occurrences in certain contexts. In other words, occurrences index 709 may offer a baseline of associations between data sets for the occurrences mapper 703 to further define, verify, or invalidate mappings. In one embodiment, the occurrences index 709 may be in communication with a front-end server 711 that provides a context. For instance, context such as time, place, or user demographics may influence mappings. Front-end server 711 may communicate with occurrences index 709 to provide the appropriate background context for occurrences mapper 703 to build on.

Figure 7B:
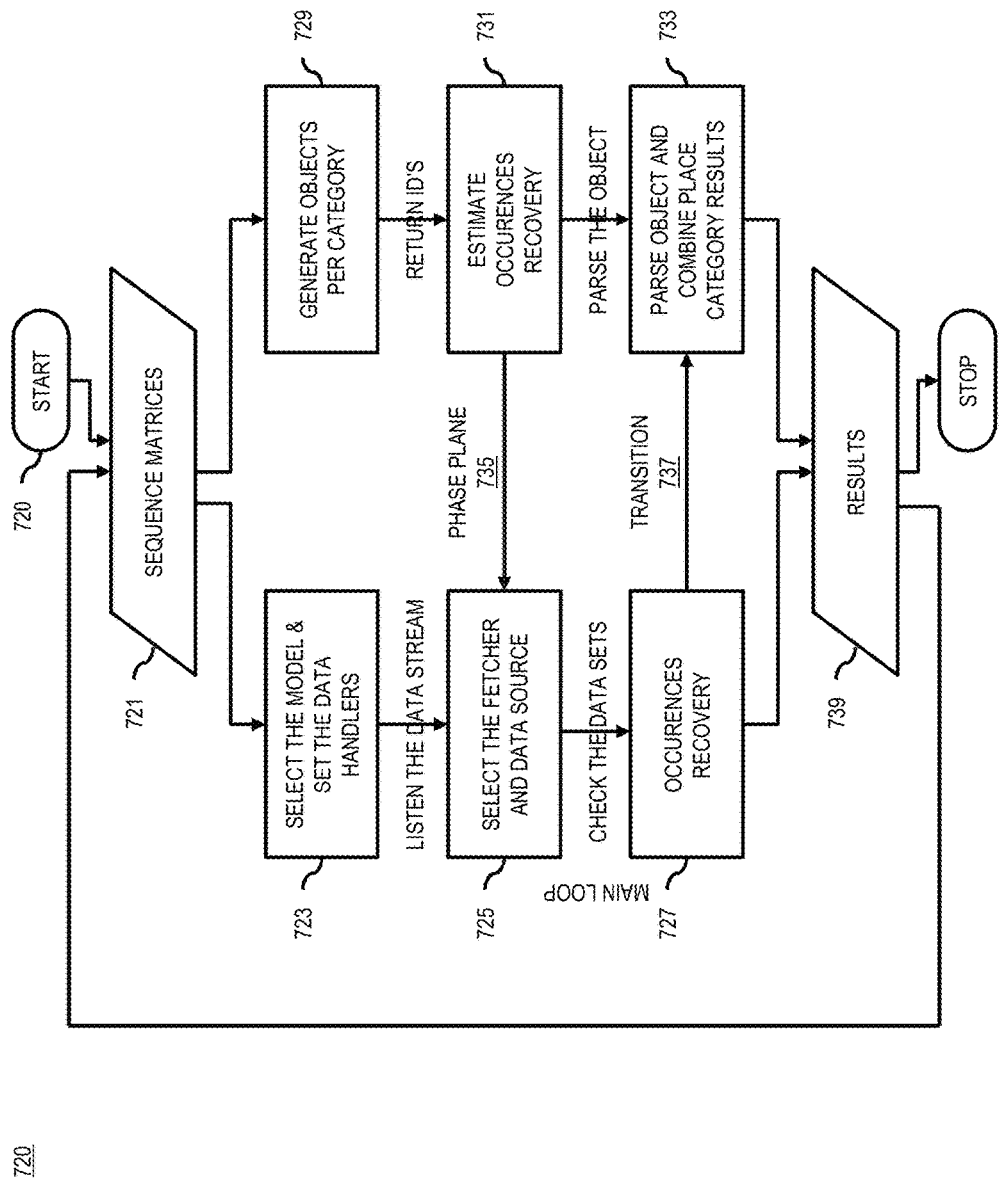
FIG. 7B is a diagram of a flow chart describing the process of the system set-up from FIG. 7A, in one embodiment.

FIG. 7B is a diagram of a flow chart describing the process 720 of the system set-up 700, in one embodiment. In one embodiment, the occurrences mapper 703 may perform step 721 of sequencing matrices, or bootstrapping random matrices. After establishing theories from the bootstrapping, the occurrences mapper 703 may perform step 723 of selecting a model and setting data handlers. For instance, step 723 may include determining a model appropriate for incoming data flow and setting initial assumptions. Setting data handlers may ensure that there is a consistent interface to compare data of from different sources, in different formats. Then, the occurrences mapper 703 may listen to a data stream, looking for data that is relevant to the model. If such data is detected, the occurrences mapper 703 may perform step 725 of selecting a fetcher and data source. This pinpoints a data stream or a group of data streams to observe more closely. Then with step 727, the occurrences mapper 703 may find coincidence between the selected data streams according to models (or paradigms), for instance, the models determined from step 723. In one embodiment, the occurrences mapper 703 may proceed to determine results, for example, information placement parameters for optimizing content placement for location-based displays.

Alternately after step 721 of sequencing matrices, the occurrences mapper 703 may generate categories. For example, the occurrences mapper 703 may perform step 729 in generating objects per category. In one scenario, this step may include the occurrences mapper 703 determining possible categorizations or associations between objects. In one case, the step 729 may include selecting an occurrences index or database that has an index for guidance in determining relationships between data sets. Next with step 731, the occurrences mapper 703 may estimate occurrences. For instance, the occurrences mapper 703 may set a prediction of how coincidence may occur between data sets. In doing this, the step 731 may include configuring how data is observed and setting possible transitions zones, where transition zones may include explanations or abstractions of coincidence. In one embodiment, the occurrences mapper 703 may then perform step 733 in adding interpreting the explanations, for instance, to explain the circumstances that may contribute to coincident occurrences. In one embodiment, step 733 may include binding the explanations to positioning location. For example, step 733 may include mapping objects (meaning data occurrences), with positioning data as previously discussed. In one embodiment, the occurrences mapper 703 may test or train the index by proceeding to reinforce step 731 using data streams. In one embodiment, this may include determining a phase plane 735 and observance data streams pertaining to the phase plane 735 to reinforce or invalidate the index.

After observing actual occurrences (from step 727), the occurrences mapper 703 may perform step 733 to interpret how or why actual data occurrences reinforced or deviated from the index. In one embodiment, step 733 may occur by determining at least one transition zone 737 between the observed and expected occurrences. In one embodiment, the transition zone between complete failure and complete success has a width of roughly $4\sqrt{2(N-n)}$. The region is asymptotically the same for certain deterministic matrices as the region for random Gaussian measurement matrices. For example, the relationship is analogous the relationship between compressed sensing and random coding. In one scenario, deterministic matrices may follow the Restricted Isometry Property such that the matrices can be built for sufficiently high k (relative to n, N). Therefore, the matrices may guarantee sparse recovery. For example, every k-sparse $x_0$ will be recoverable. Lastly, the occurrences mapper 703 may determine results including, for instance, information placement parameters. The occurrences mapper 703 may also reach step 739 directly after performing a process of step 721 followed by steps 723, 725, and 727.

FIGS. 8A-8D are diagrams of a set 800 of user interfaces for devices interacting with location-based displays. In one embodiment shown in FIG. 8A, home screen 801 may include a live tile or menu to initiate assistance. Assistance may include displaying maps on a device as a user is traveling, for instance, so that a user may have the option of interacting with location-based displays. Upon clicking a tile or menu from home screen 801, the system 100 may display splash screen 803 while navigational services are loading. Once map or navigational services are available, the system 100 may start to show a map screen 805 for the services. Alternately or in addition, a user may employ the set 800 of user interfaces while engaging guidance, for instance, navigational guidance. For navigational guidance, a user may initiate an application, for instance, application 113 and set a destination. Then map screen 805 may include a map and route to lead a user to the set destination. In one embodiment, navigational guidance may include directions to a destination. In another embodiment, navigational guidance may include context information, for example, information on traffic or road conditions. For instance, a navigational guidance application or service may provide a notification that a road is blocked and offer an alternate route.

Figure 8B:
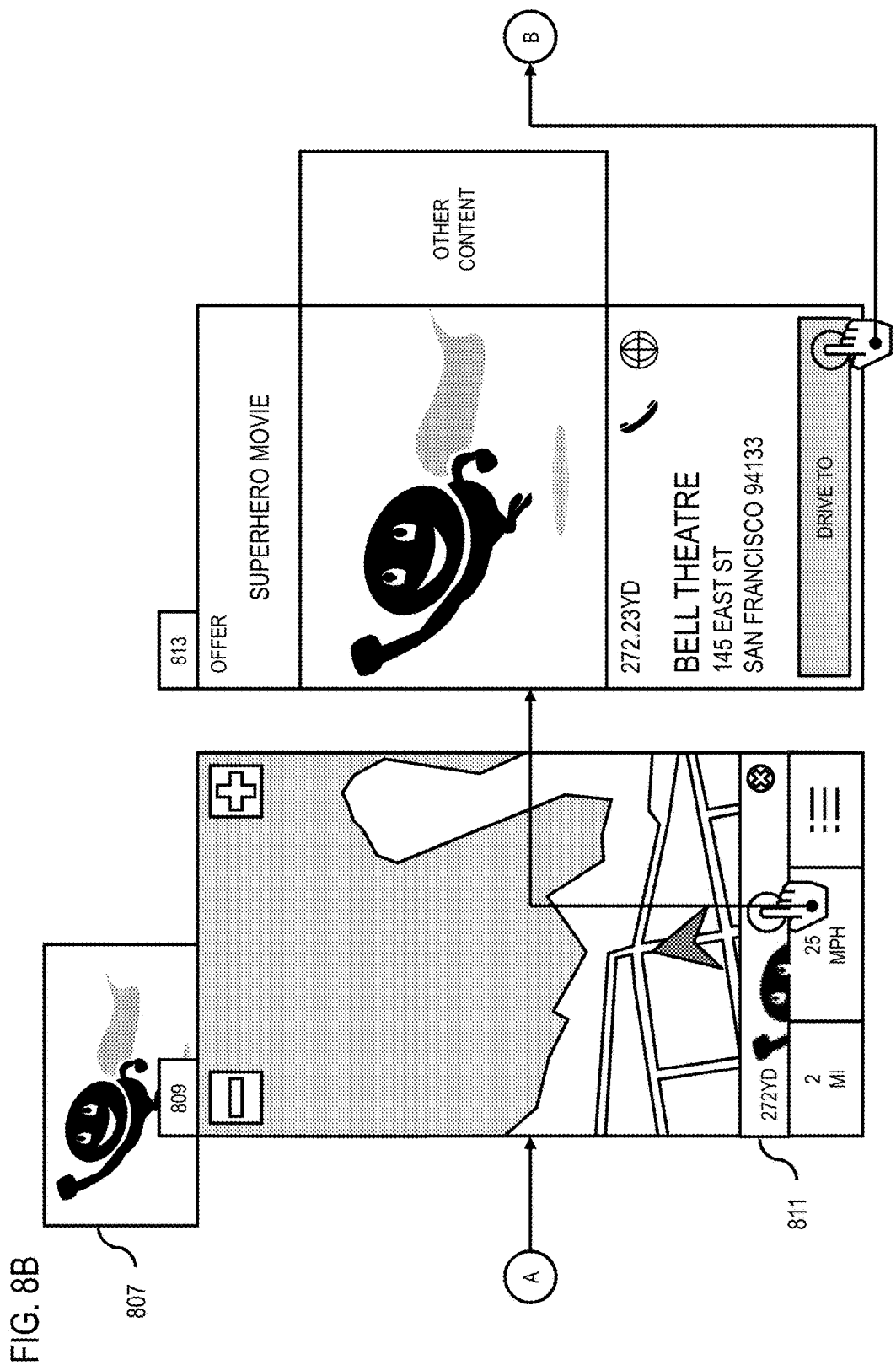

FIG. 8B illustrates an embodiment where a device passes by out of home asset 807. Here, screen 809 may display part of the out of home asset display campaign, for instance, banner 811. In one embodiment, system 100 may show banner 811 in an area designated for street names as part of the navigational services. In one embodiment, banner 811 may disappear after a pre-set time limit. For example, banner 811 may disappear after 15 seconds. Alternately, banner 811 may disappear based on context cues. For instance, banner 811 may automatically disappear when another out of home asset is available or if a user reaches a certain distance from the location of the out of home asset 807. In one embodiment, a user may close the banner 811, causing the banner 811 to go idle. This idle state may mean that a device may store the banner 811 or provide a way to retrieve the banner 811, while not displaying the banner 811 after it is closed by the user. In one embodiment, interaction with banner 811 may initiate rendering of a detail view 813. In one instance, detail view 813 may include a detailed image (of the location-based display, or the out of home asset in this example), coupons, videos, and/or address and contact information.

Figure 8C:
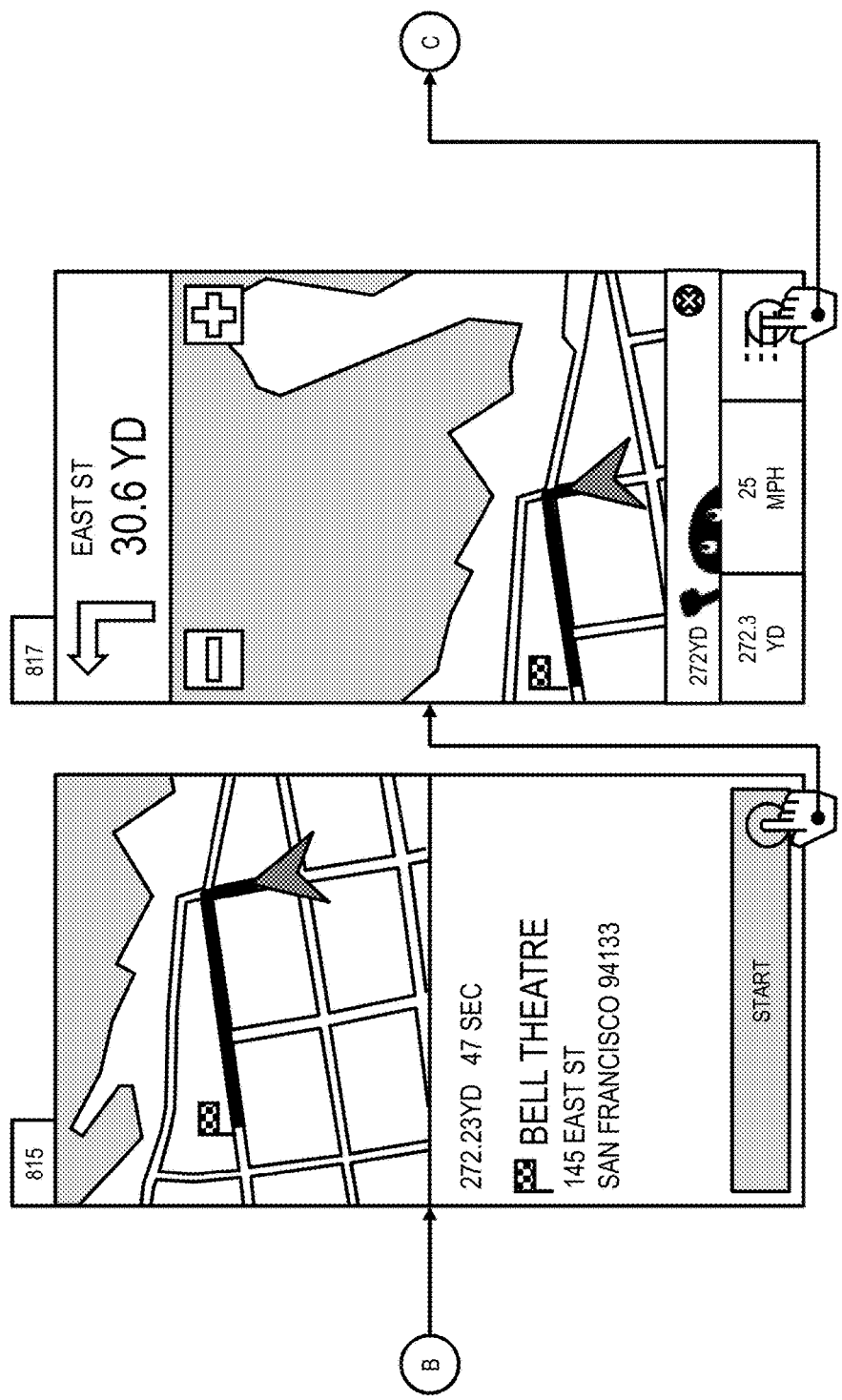

FIG. 8C illustrates displays where a user may wishes to view more detailed information, in one embodiment. If a user selects for further information from the detail view 813, the system 100 may, for example, show a route overview 815 and/or a guidance screen 817. In one embodiment, the route overview 815 may present an entire route that a user may then interact with for more details or to change directions. A guidance screen 817 may show navigational steps of a route, step-by-step.

Figure 8D:
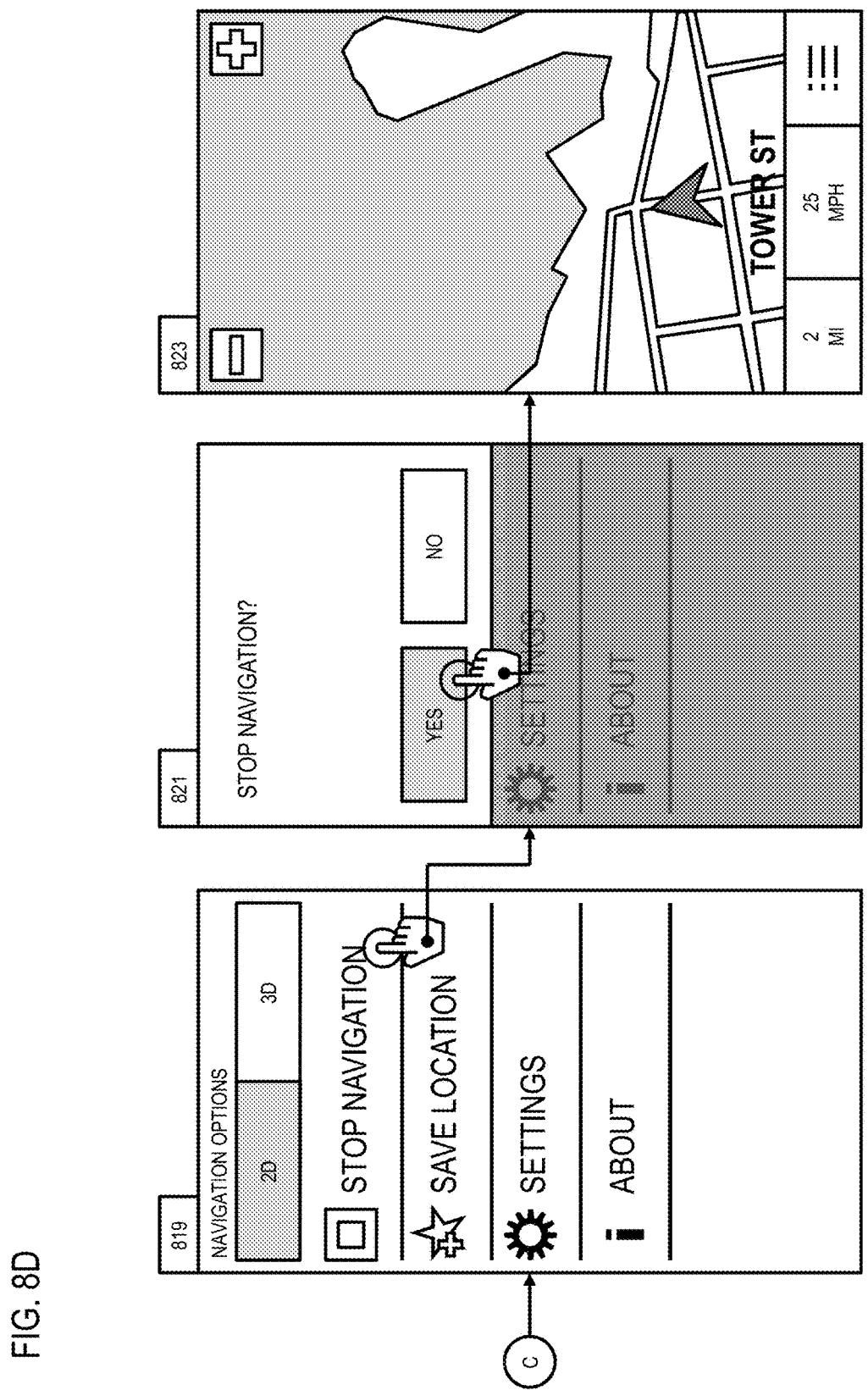

FIG. 8D shows more displays and options for detailed information, in one embodiment. In one embodiment, further screen options may include options screen 819 and confirmation overlay 821. Options screen 819 may show navigation options, for example, allowing a user to view navigation in two-dimensional or three-dimensional map views, stop navigation, settings, or information about the navigation service. Confirmation overlay 821 may display upon user selection of an option from options screen 819, for example, "stop navigation." Confirmation overlay 821 may prompt a user to confirm that he/she wants to end navigation. Where a user is employing a service like a guidance service for navigational help, the confirmation overlay 821 may display when route overview 815 is selected. In other words, the system 100 may first prompt a user to confirm that he wants to stop his current navigation towards the set destination and potentially change paths to follow a route towards a destination associated with the campaign displayed on the out of home asset 807.

FIGS. 9A-9E are diagrams of user experiences that may correspond to the interfaces of FIGS. 9F-9K, in one embodiment. In one embodiment shown in FIG. 9A, system 100 may determine location and direction information 901, for instance, location and direction information associated with a particular user 903. From the location and direction information 901, the system 100 may determine at least one location-based display 905 and proceed to retrieve or render a mirror 907 for devices associated with the user 903. In one embodiment shown in FIG. 9B, proximity to a location-based display or interaction with the mirror 907 may prompt system 100 to generate navigational guidance 909 directing the user 903 to the nearest participating vendors or points of sale for products associated with the display. Navigational guidance 909 may include, for instance, driving directions, walking directions, and/or routes available via public transport. In a further embodiment, the system 100 may generate further supplemental information related to navigational guidance 909, for instance, time tables 911 for public transport to facilitate users' usage of navigational guidance 909.

Figure 9A:
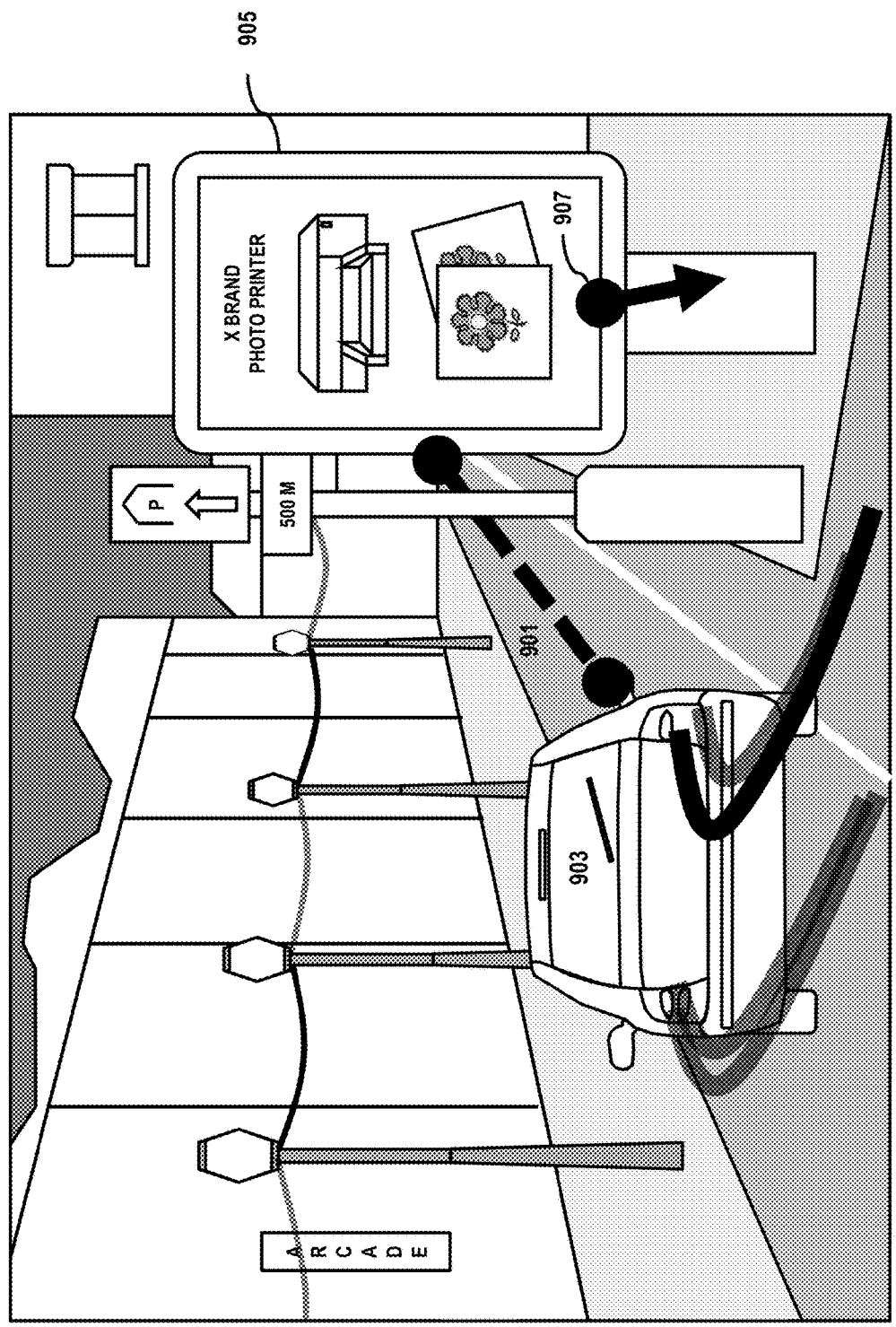
FIGS. 9A-9E are diagrams of user experiences as associated with the processes of FIG. 3, according to one embodiment.
Figure 9B:
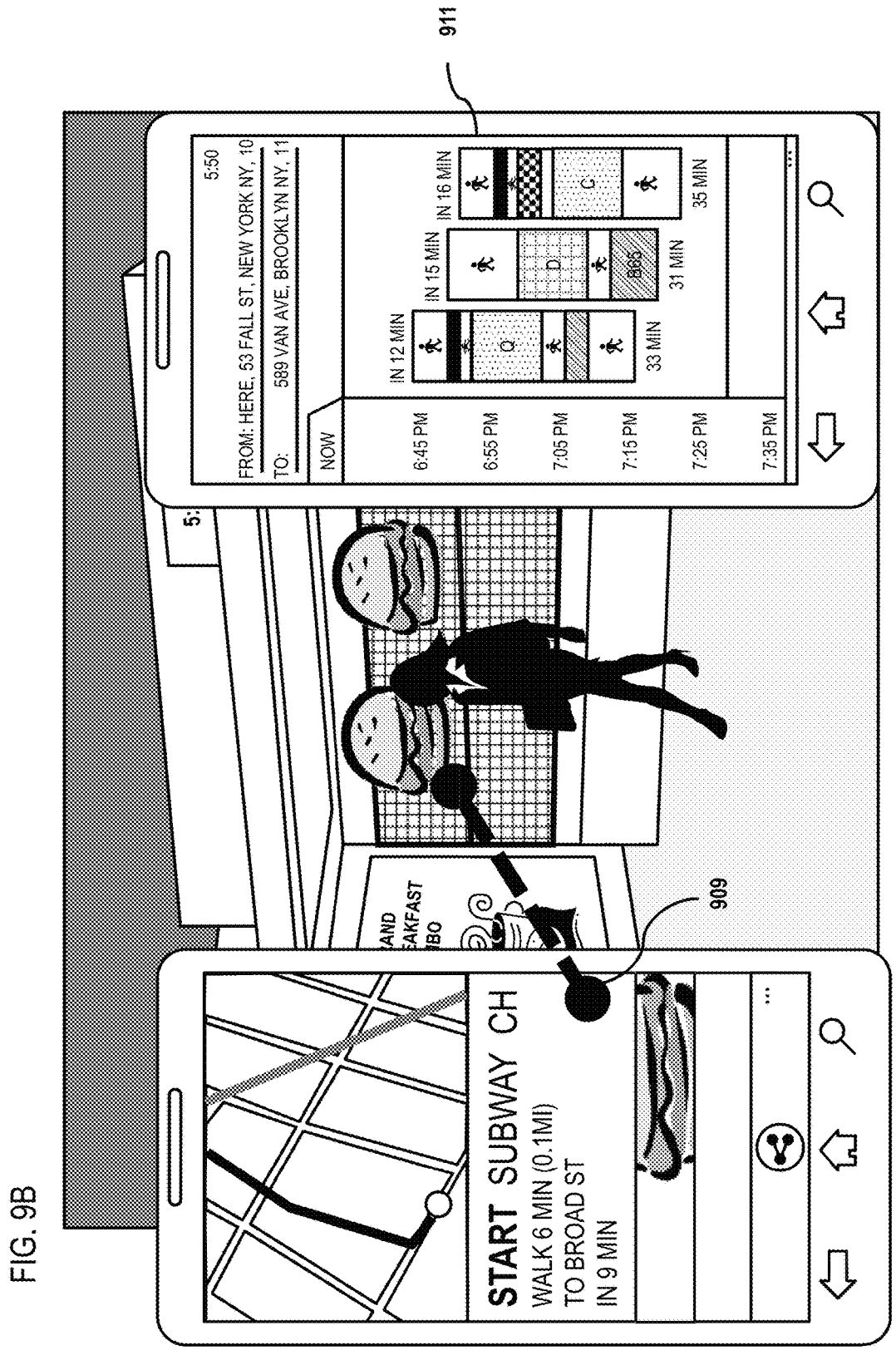
Figure 9C:
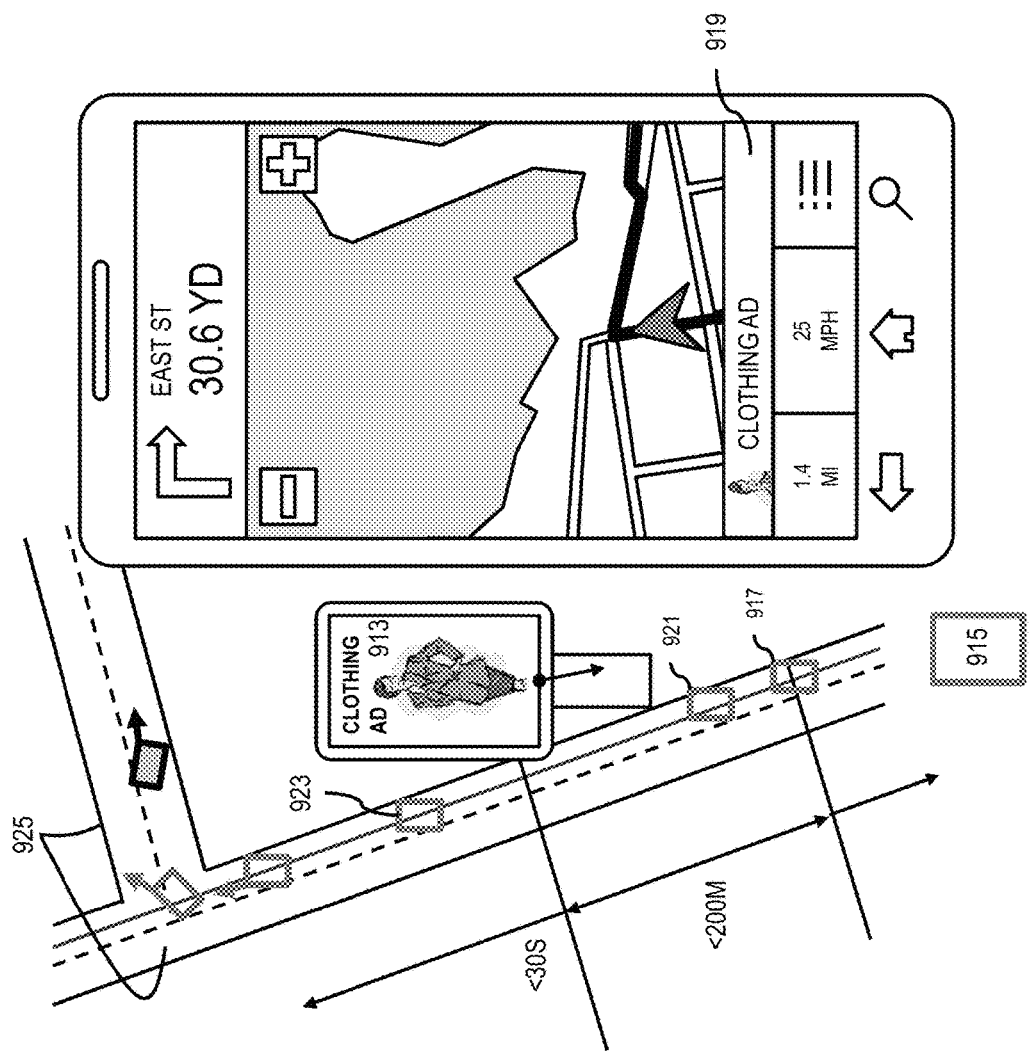
Figure 9D:
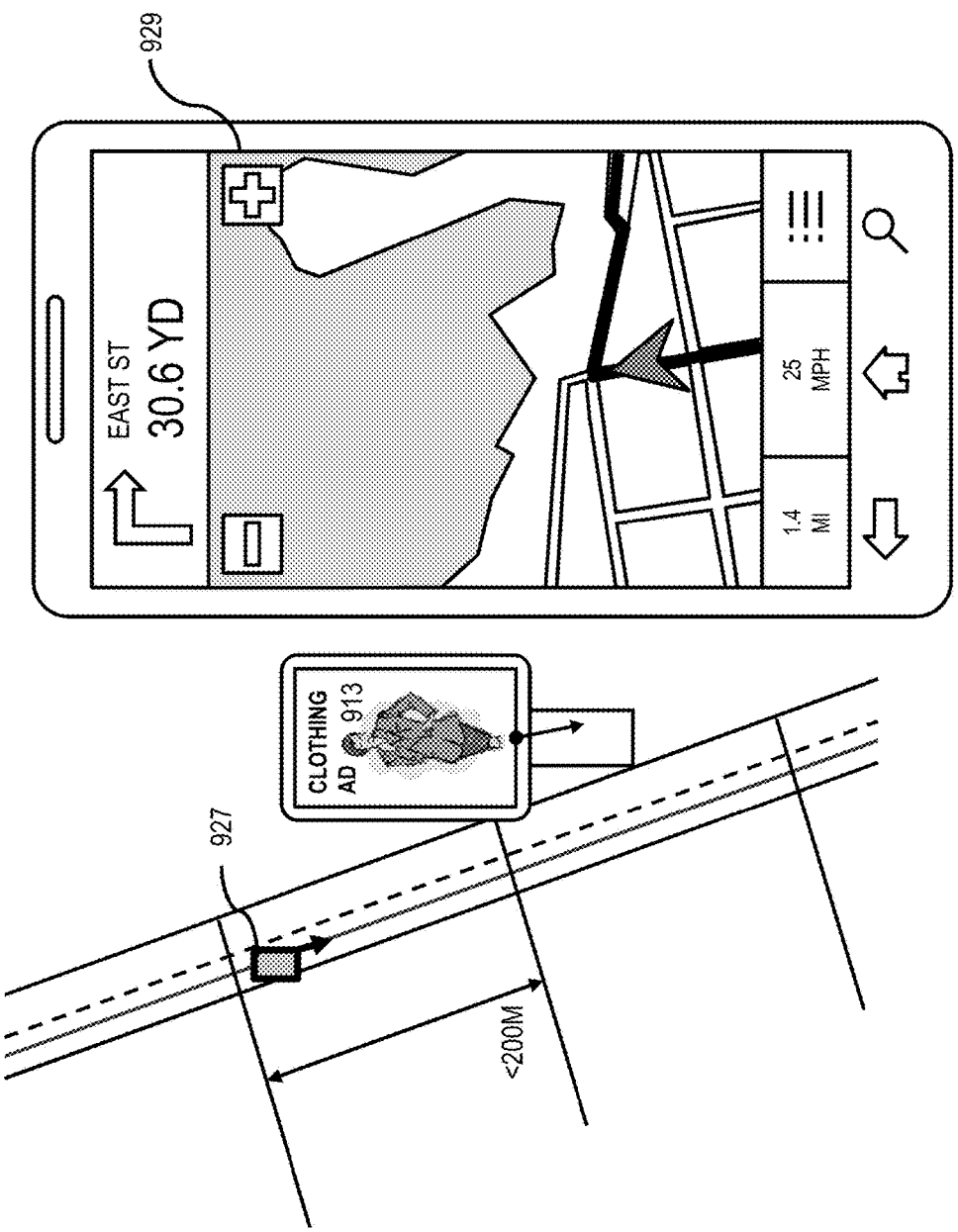

FIGS. 9C and 9D may show how location-based displays may be presented on devices based on device position with respect to a location-based display. FIGS. 9C and 9D may specifically pertain to a device that is traveling in a vehicle. For example in FIG. 9C, location-based display 913 may be over 200 meters from a device 915 when the device is at position 917. In this case where the device 915 is at position 917, device display 919 may not yet appear. However, at position 921 where the device 915 is less than 200 meters from the location-based display 913, device 915 may receive device display 919. At position 923, the device 915 may have passed the location-based display 913, but the device display 919 may linger 30 seconds after the device 915 passes the location-based display 913. Alternately if no other location-based display 913 is detected, device display 919 may remain on the device 915 as well. In one embodiment, device display 919 may remain presented on device 915, for example, until a user takes action, until a pre-specified amount of time passes since the device display 919 was first presented, another location-based display 913 is detected, or a combination thereof. In one embodiment shown in FIG. 9A, system 100 may determine location and direction information 901, for instance, location and direction information associated with a particular user 903. In one embodiment, as device 915 detects another location-based display, the device display 919 may replace a previous display with a display corresponding to the most recently detected location-based display. In one embodiment, the device display 919 may disappear or temporarily disappear when certain context parameters are detected. For instance with positions 925, device 915 may be turning or approaching a junction. In this scenario, device display 919 corresponding to the location-based display 913 may disappear so that the device fully shows only navigation information.

In one embodiment shown in FIG. 9D, device 915 may approach from a position 927 where a location-based display 913 the device is within an appropriate distance for a device display 919, but the location-based display 913 may not actually be visible to a user of device 915 because of the respective directions of device 915 and location-based display 913. In one instance, device 915 would show only a navigation screen 929 with no device display 919 of the location-based display 913. This way, device display 919 is not switching constantly between out of home assets that are facing the direction of motion of device 915 and out of home assets facing away from the direction of motion of device 915. Furthermore, device display 919 may reflect the location-based displays 913 actually visible to a user of device 915. Alternately, users may elect to have all location-based display within a certain radius of a device 915 to be shown as device displays, regardless of whether the users see the location-based displays themselves.

Figure 9E:
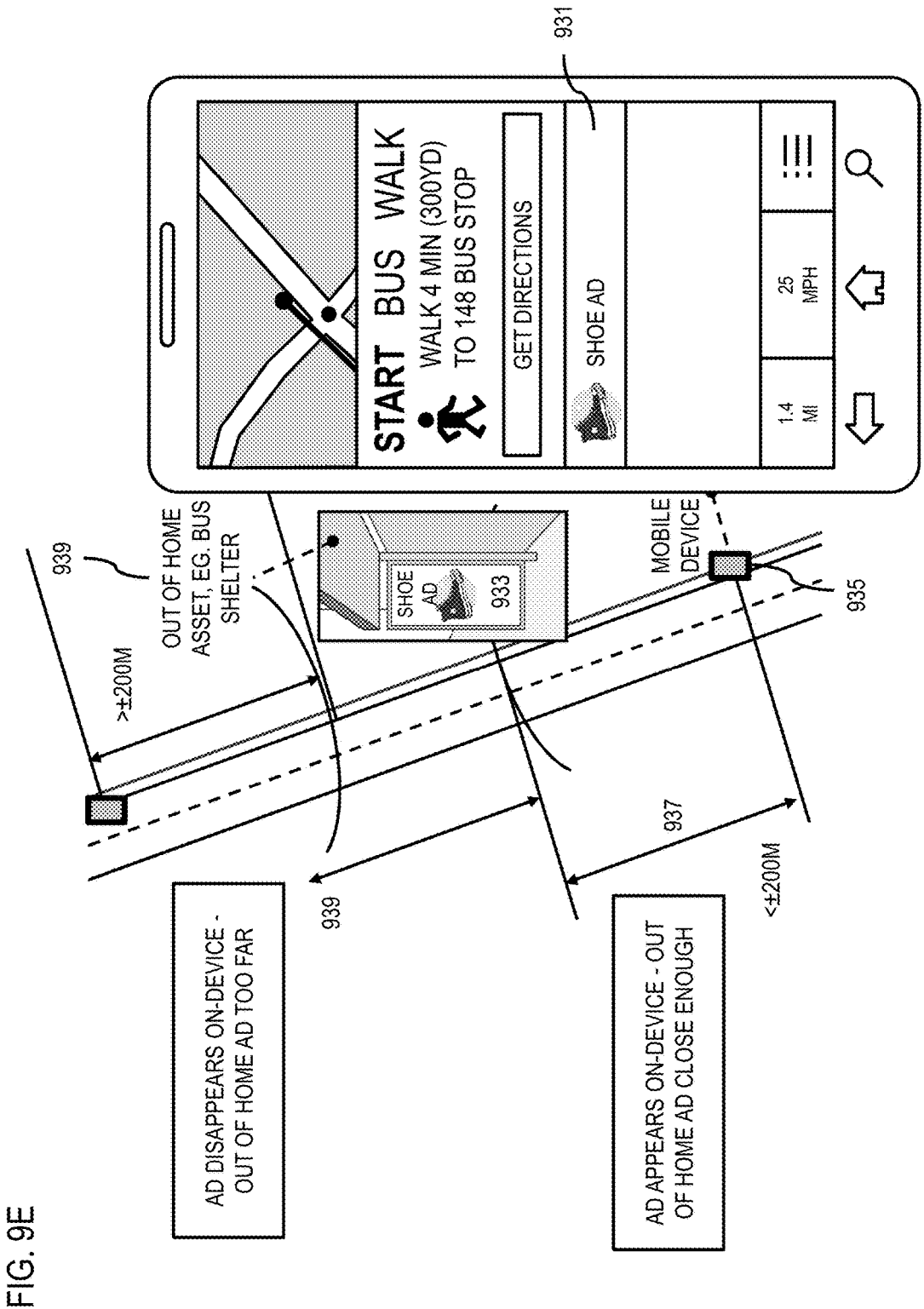

FIG. 9E illustrates a scenario for a pedestrian, in one embodiment. Similar to FIGS. 9C and 9D, presentation of device display 931 may depend on the spatial or temporal proximity between location-based display 933 and device 935. Location-based display 933 may be a shoe advertisement in a bus shelter. Then, as device 935 is within distance 937 (for example, 200 meters) of the location-based display 933, device display 931 may appear on device 935. As device 935 passes location-based display 933 or travels more than 200 meters from the location-based display 933 into distance 939, device display 931 may disappear from view.

Figure 9F:
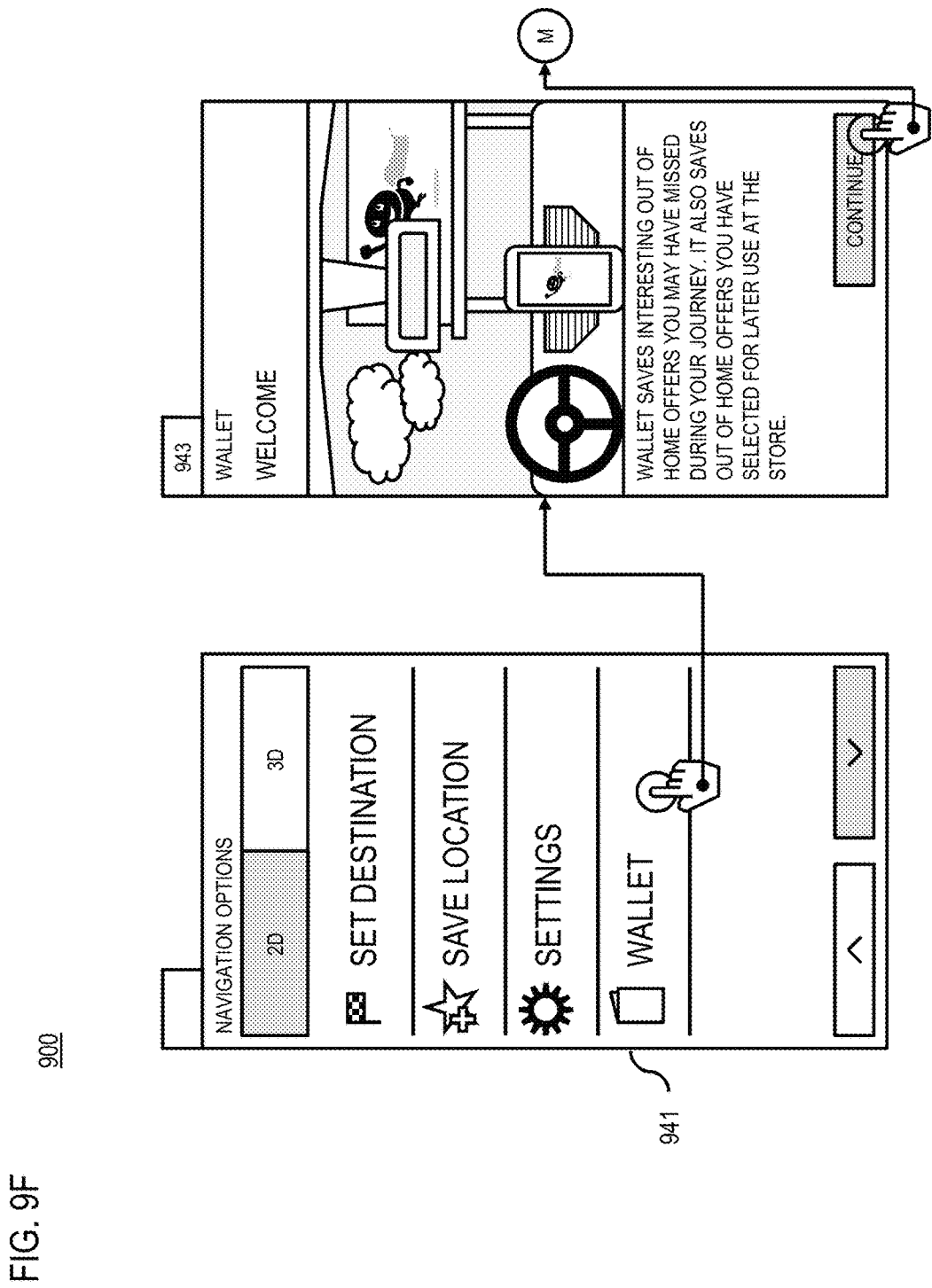
FIGS. 9F-9K are diagrams of user interfaces that may correspond to the user experiences of FIGS. 9A-9E, according to one embodiment.

In one embodiment shown in FIG. 9F, wallet 941 may include a welcome screen 943, where a user may select "Continue" in order to save location-based displays for access on the device. In one embodiment, selection of "Continue" may lead to a wallet main screen 945 showing a collection of selected, saved versions 947 of location-based displays.

Figure 9G:
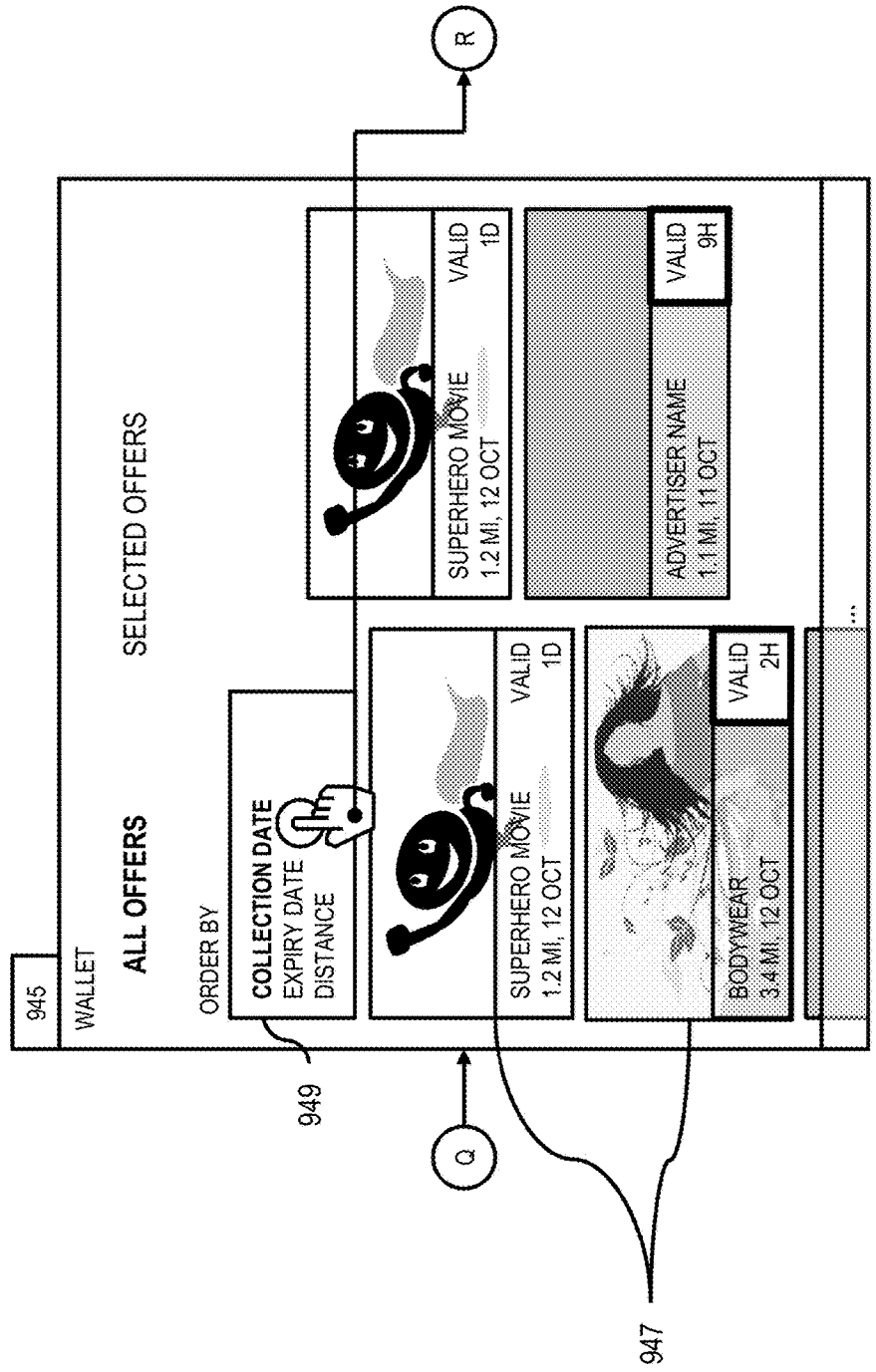

FIG. 9G shows a main screen for a wallet, in one embodiment. In one embodiment, the main screen 945 may include a sorting option 949, for example, allowing for sorting by the date that the displays were collected, when offers from the displays expire, or distance for locations associated with the displays. In one embodiment, versions 947 may also include versions of the information associated with sorting option 949.

Figure 9H:
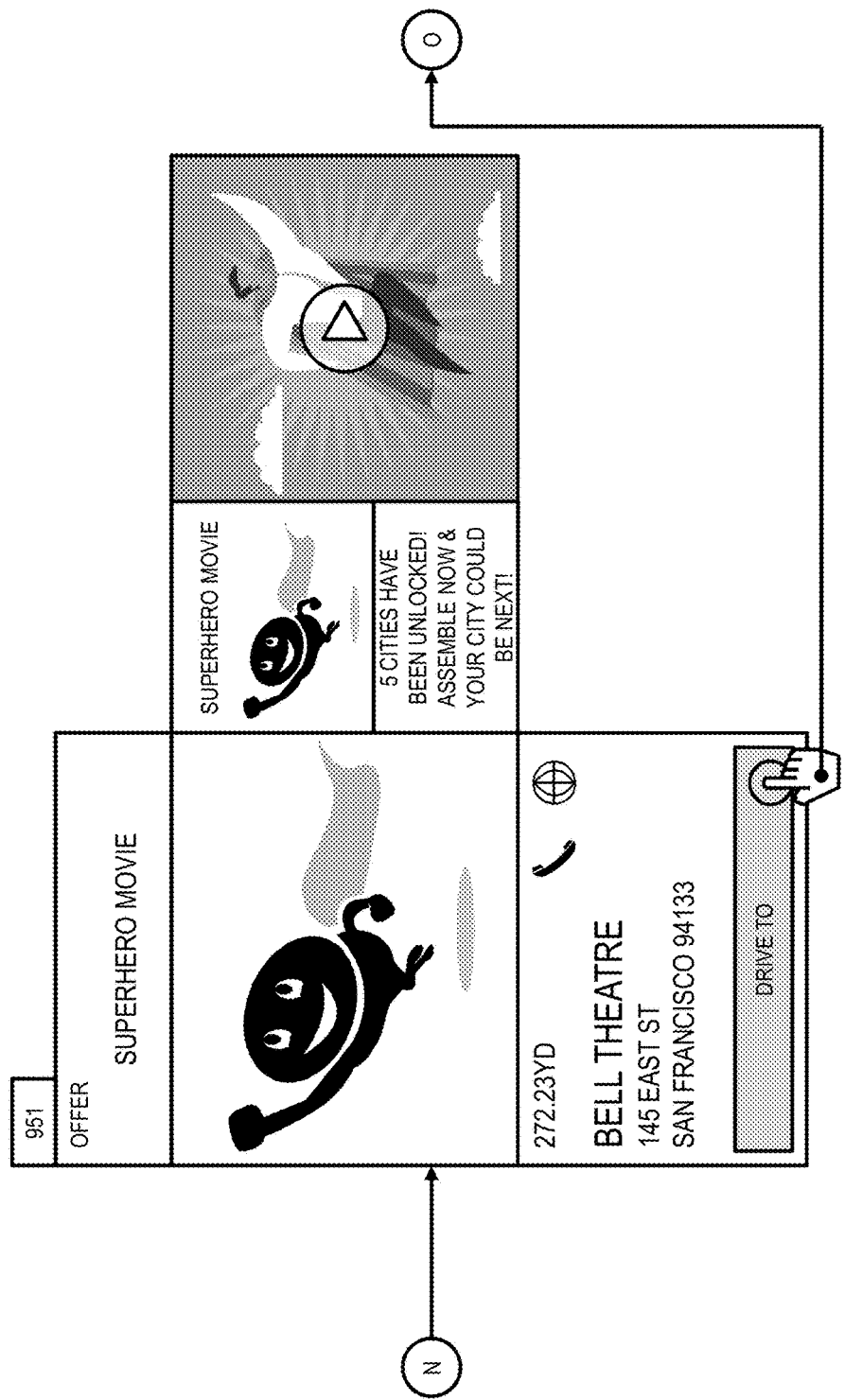

FIG. 9H shows a detailed view associated with the wallet, in one embodiment. In one embodiment, selecting one of the versions 947 may lead to a detail view 951 of the display, similar to detail view 813. Selection of options from the detail view 951 may lead to navigation screens similar to route overview 815 and/or guidance screen 817. As the user is navigating, he may continue usage of wallet 941, continuing to save versions 947 of location-based displays as he is en route to a location associated with a selection chosen from previously saved versions 947. A user may also have the option to delete some or all of versions 947. In one embodiment, subsets of versions 947 may automatically disappear as the offers expire.

Figure 9I:
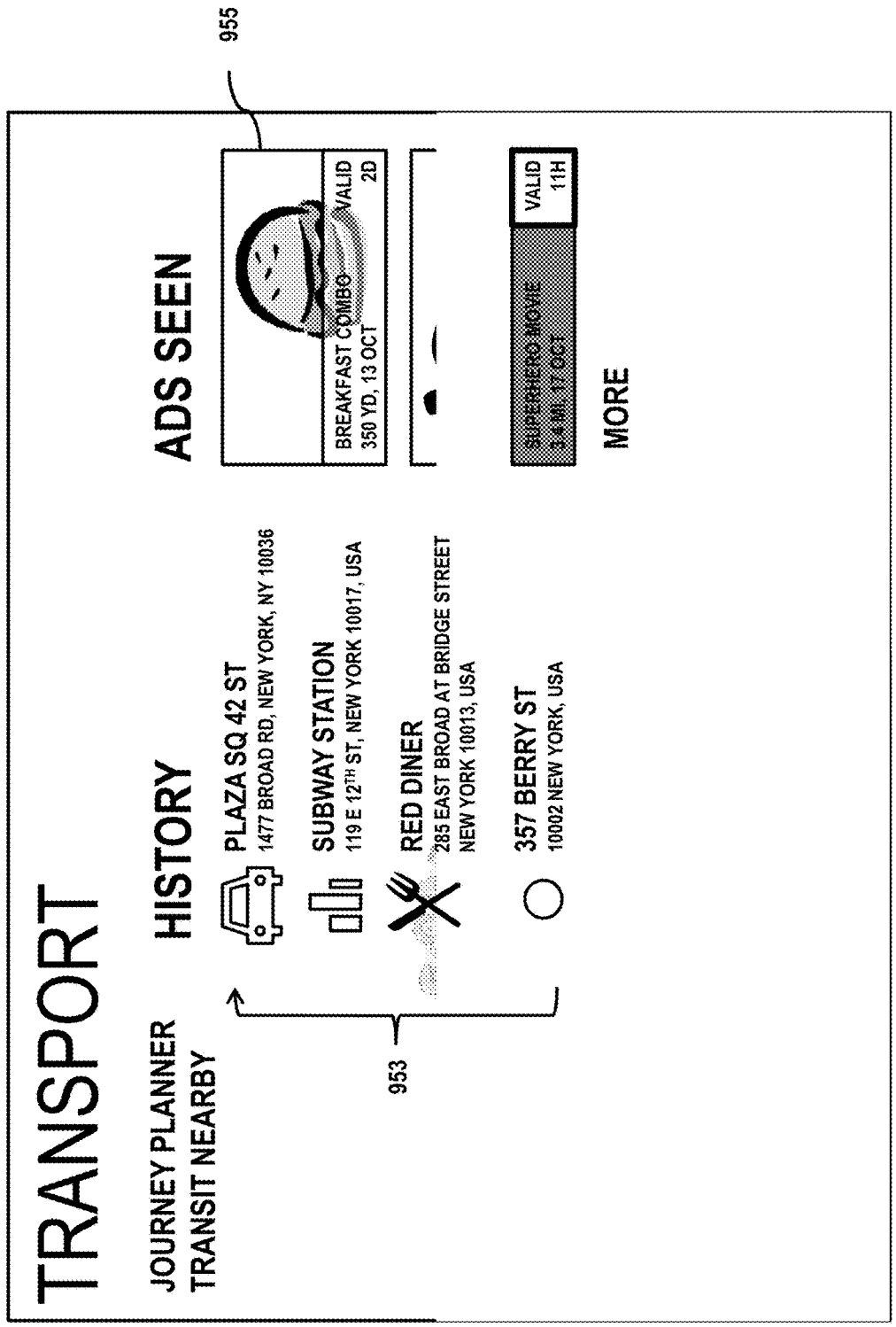

In one embodiment, the system 100 may further generate the interface of FIG. 9I, for a user to access displays that he might want to revisit. For example, the system 100 may include a listing 953 including points along a user's route. Then, the system 100 may show content 955 corresponding to the listing 953. As previously described, the user may select the listing 953 and/or content 955 to access supplemental information.

Figure 9J:
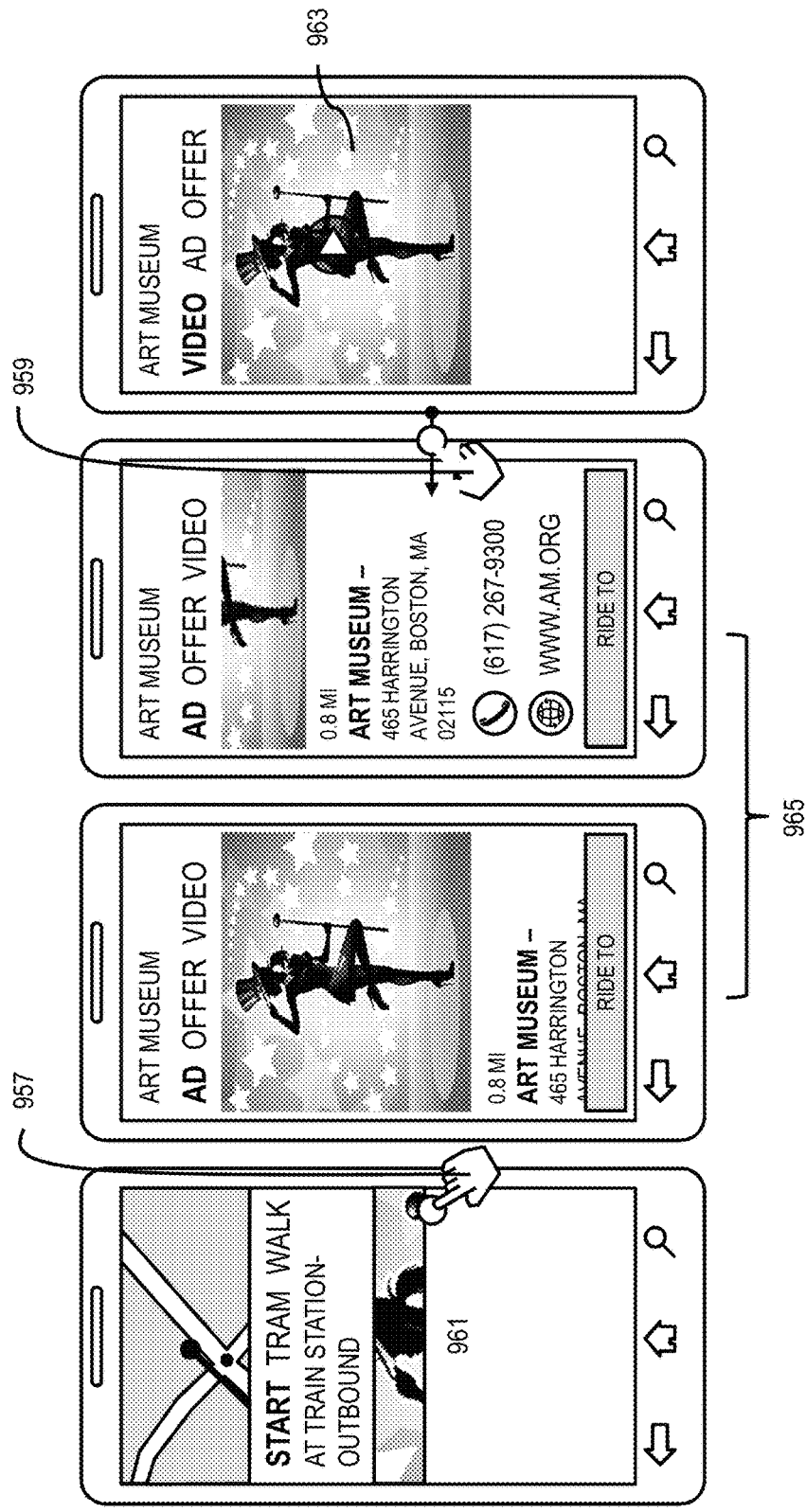
Figure 9K:
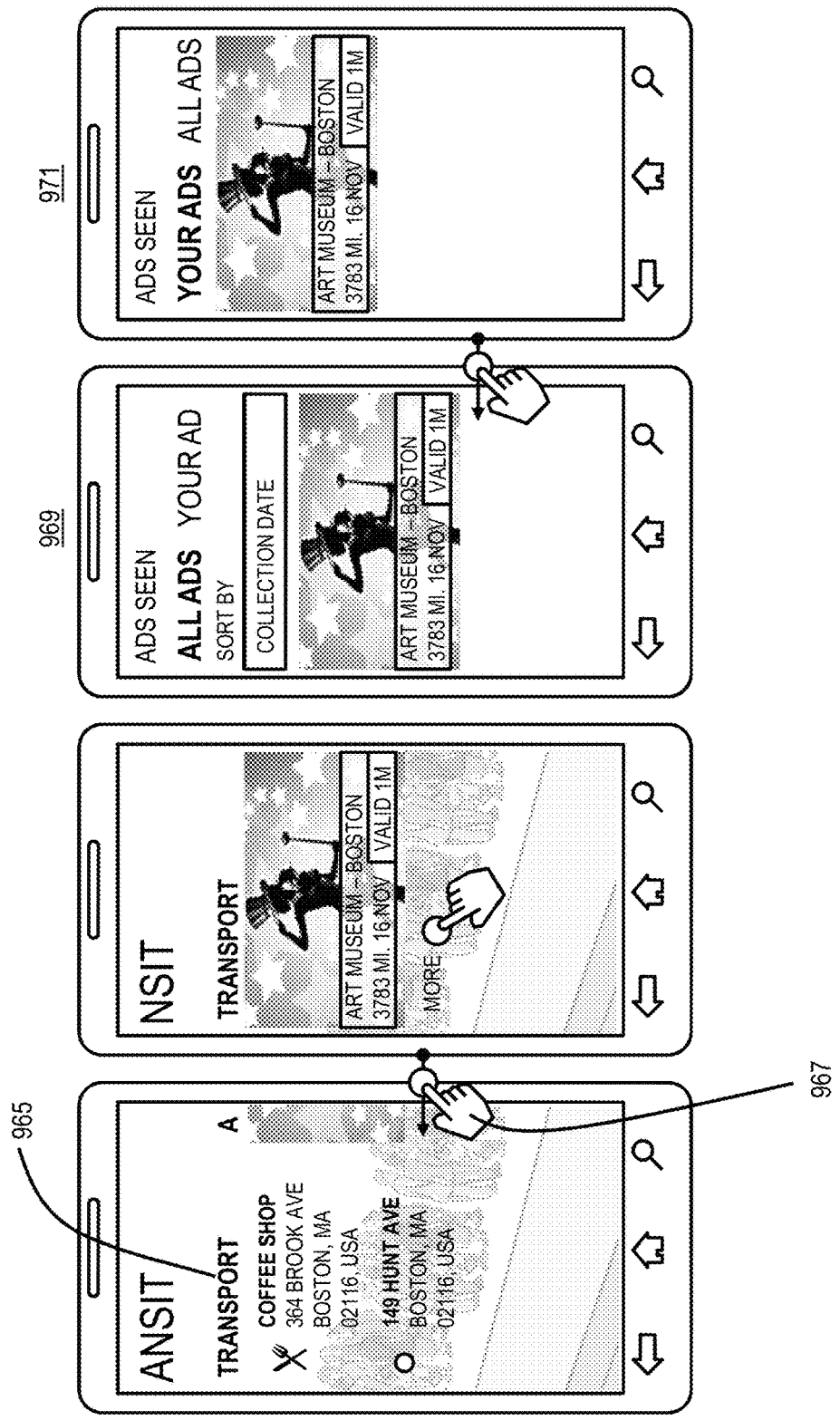

FIGS. 9J and 9K show possible means of user interaction with presentations of location-based displays on devices, in one embodiment. In one embodiment of FIG. 9J showing user interaction with a display, a user may click a selection button 959 a presentation of a location-based display on a device for more detailed information. In one embodiment, users may scroll or slide 961 between various collections of detailed information or options regarding the display. For instance, a user may click selection button 959 on display 963 to lead to navigation information 965 on how to get to the content in the display 963. In another instance user may use screen slide 961 to access a promotional video related to display 963.

In one embodiment with FIG. 9K showing user interaction with stored displays, users may also use select and slide functions. For example, a user may open a menu 967 of locations visited. Then, a user may use a slide option 969 to see location-based displays that are along a user's path as she traveled to the locations visited. In one embodiment, the user may opt to see screen 971 showing all the location-based displays along this path. In another embodiment, the user may elect to view screen 973, showing only location-based displays that the user had selected, interacted with, or stored while traversing the path.

The processes described herein for determining performance of location-based displays may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
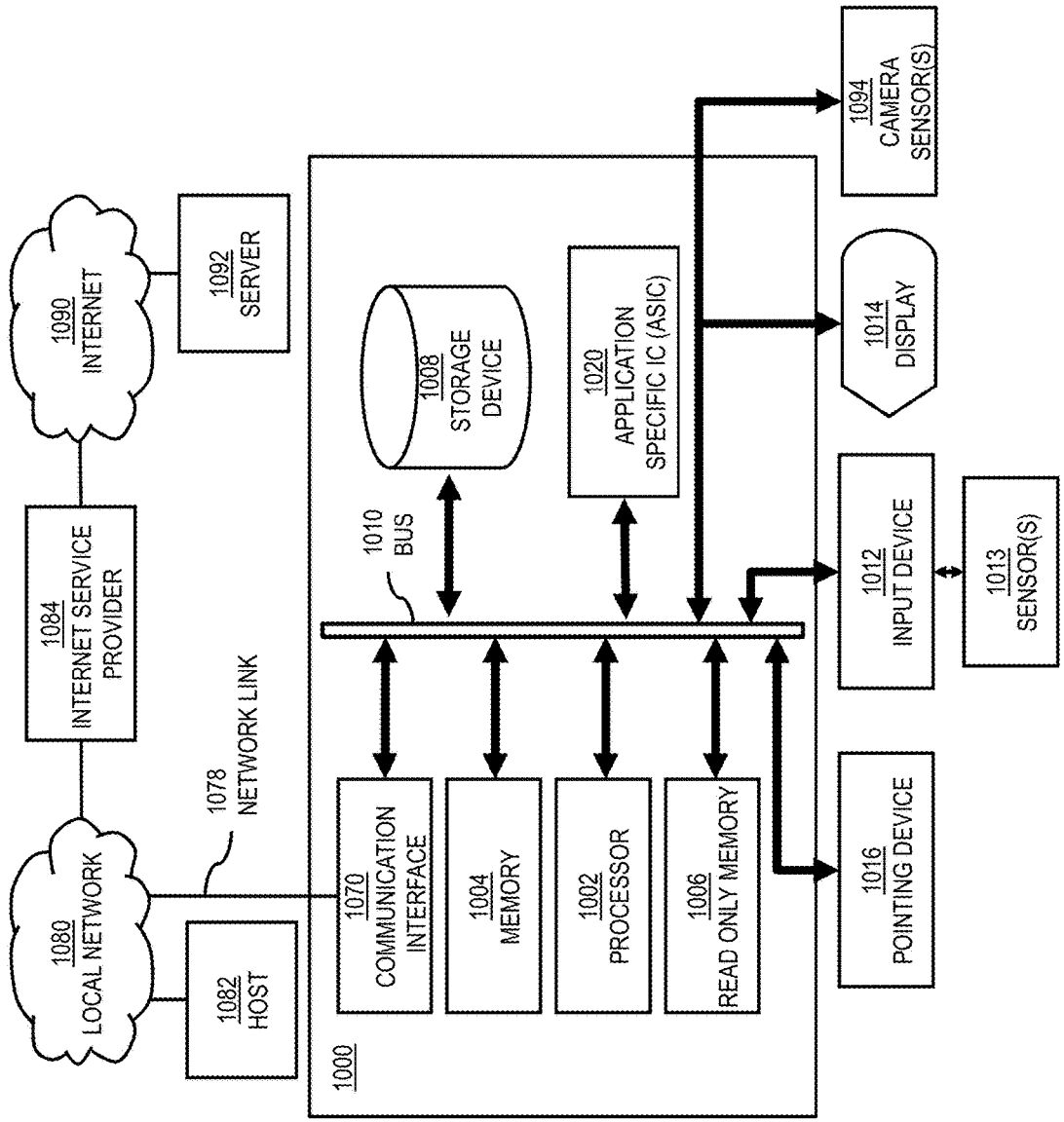
FIG. 10 is a diagram of hardware that can be used to implement an embodiment of the invention; (the notion of any other sensors should be added to the drawing)

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to determine performance of location-based displays as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of determining performance of location-based displays.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to determine performance of location-based displays. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for determining performance of location-based displays. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining performance of location-based displays, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor 1013. A sensor 1013 detects conditions in its vicinity and transforms those detections into physical expression compatible with the measurable phenomenon used to represent information in computer system 1000. For instance, a sensor 1013 may include an accelerometer, a location sensor, a temperature sensor, etc. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for determining performance of location-based displays for the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to determine performance of location-based displays as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of determining performance of location-based displays.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to display content using high accuracy wireframes. The memory 1105 also stores the data associated with or generated by the execution of the inventive steps.

Figure 12:
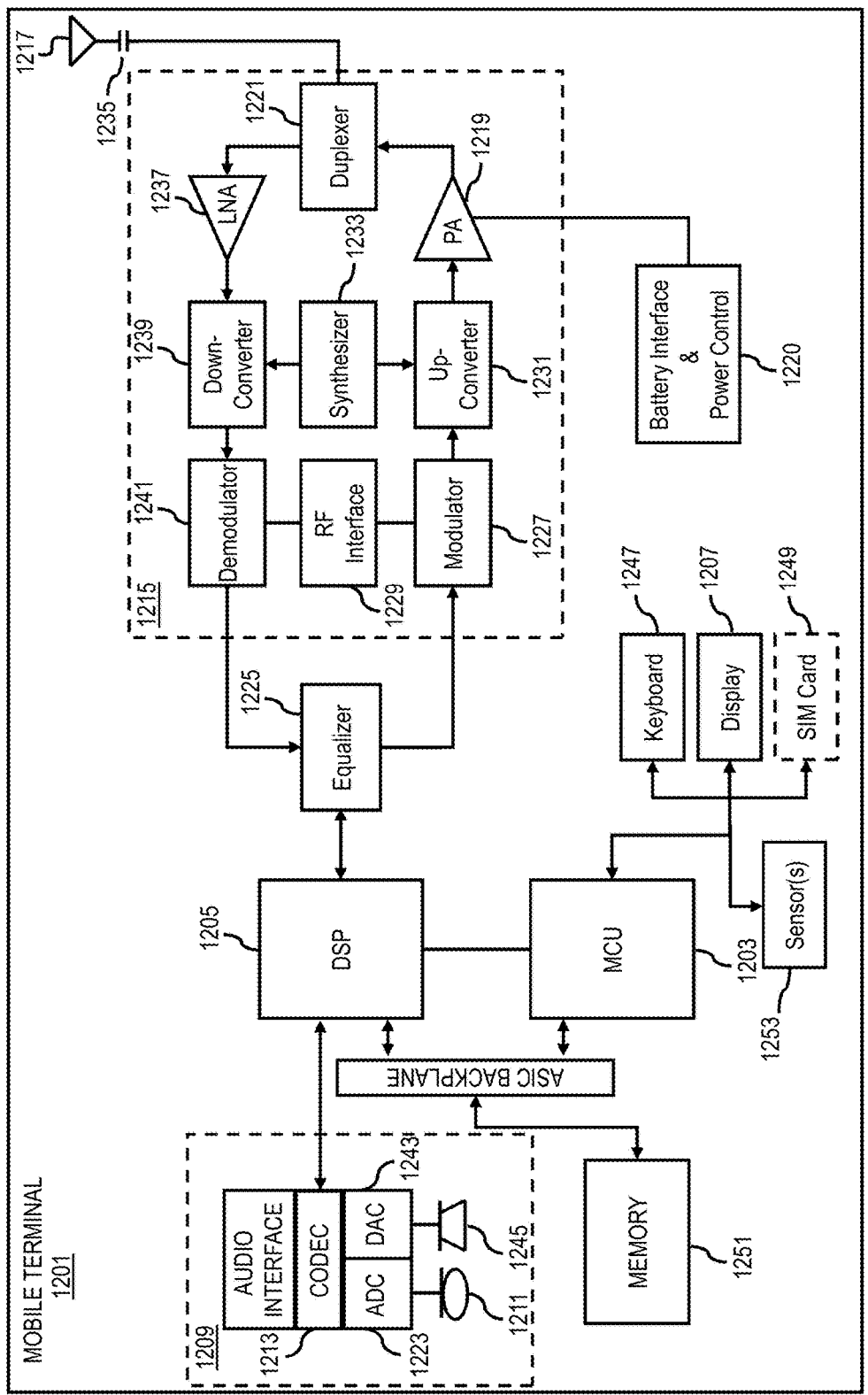
FIG. 12 is a diagram of a mobile terminal (e.g., handset) that can be used to implement an embodiment of the invention. (the notion of any other sensors should be added to the drawing)

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of determining performance of location-based displays. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of determining performance of location-based displays. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to determine performance of location-based displays. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, the mobile station 1201 may include one or more sensors 1253. In one embodiment, the one or more sensors 1253 may further include camera sensors wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing, by an apparatus, a data stream associated with a device to extract one or more data sets;
   upon detecting that the device is proximate to a location-based public display which is bound to a geographic location, determining, by the apparatus, one or more arbitrary events data sets from among the one or more data sets based on a coincidence of the one or more arbitrary events data sets with the location-based public display, wherein the coincidence includes temporal proximity, spatial proximity, or a combination thereof, of user behaviors, user devices, user operations on the user devices, or a combination thereof;
   initiating, by the apparatus, a display on the device of a copy of an information placement on the location-based public display facing a motion direction of the device, wherein the display of the copy of the information placement occurs in real time or substantially in real time with the detecting and continues after the device faces away from the location-based public display, temporarily disappears until moving away beyond a predetermined distance from the location-based public display, and reappears when moving into the predetermined distance from the location-based public display;
   calculating, by the apparatus, a user view-through rate, a user click-through rate, and a user purchase rate associated with the copy of the information placement on the device; and
   updating, by the apparatus, one or more information placement parameters for the location-based public display based on the calculation,
      wherein the one or more arbitrary events data sets include a user view-through operation, a user click-through operation, a user purchase operation, and information of one or more other user operations performed at the device.

2. A method of claim 1, wherein the extraction of the one or more data sets, the determination of the one or more arbitrary events data sets, or a combination thereof, occur in real time or substantially in real time with the detecting and is based on a word and phrase extraction reflecting user knowledge, one or more data models, and one or more data normalization processing models,
   wherein the display of the copy of the information placement continues after the device faces away from the location-based public display, and until a predetermined time period passes, and
   wherein when the extraction of the one or more data sets occur in real time or substantially in real time with the detecting and is based on the one or more data normalization processing models, each of the one or more data models and the one or more data normalization processing models classifies certain values as normal and other values as outliers or exceptions.

3. A method of claim 1, further comprising:
initiating a display on the device of directions to a location associated with the information placement;
determining that the one or more other user operations are in contextual proximity to the location-based public display, and
wherein the one or more information placement parameters include a suppression parameter describing circumstances where the device is prevented from interacting with a location-based public display due to at least a device technical function limitation, a location-based public display technical function limitation, and a technical incompatibility between the device and the location-based public display, other than lack of user interest.

4. A method of claim 3, further comprising:
initiating a display on the device of information on scheduled transport options to the location associated with the an information placement;
initiating a storage, on the device, of the copy of the information placement;
initiating a subsequent display, on the device, of the copy of the information placement in a wallet application; and
determining archetypal information, one or more behavioral models, or a combination thereof for a user of the device based on the one or more arbitrary events data sets, the one or more other user operations, or a combination thereof, wherein the archetypal information is determined based, at least in part, on user preferences, and the one or more behavioral models are determined based, at least in part, on user behaviors, and
wherein the one or more information placement parameters are further based on the archetypal information, the one or more behavioral models, or a combination thereof.

5. A method of claim 4, wherein the information on scheduled transport options includes timetables, possible delays, or a combination thereof, wherein the data stream, the one or more data sets, the one or more arbitrary events data sets, or a combination thereof include positioning data gathered from map content information, one or more location-based services, or a combination thereof, and the method further comprising:
determining navigation information from a current location of the device to a point of interest associated with the information placement on the location-based public display, in real time or substantially in real time with the detecting.

6. A method of claim 5, further comprising:
initiating a binding of the positioning data to the archetypal information, the one or more behavioral models, or a combination thereof to determine one or more user intents with respect to the location-based public display.

7. A method of claim 6, further comprising:
determining the one or more information placement parameters based on the binding, the positioning information, or a combination thereof.

8. A method of claim 3, wherein the display of the copy of the information placement continues after the device faces away from the location-based public display, and until moving away beyond the predetermined distance, or until a predetermined time period passes, or until another location-based public display is detected, and the method further comprising:

switching the display of the copy of the information placement to a display of a copy of another information placement on the another location-based public display on the device;
initiating a construction of at least one normal distribution of the one or more arbitrary events data sets in relation to the one or more operations; and
determining one or more outlier areas of the at least one normal distribution,
wherein the one or more information placement parameters are further based on the one or more outlier areas.

9. A method of claim 1, further comprising:
initiating a display on the device of a copy of another information placement of another location-based public display upon the device moving within a predetermined distance from the other location-based public display, wherein the other location-based public display faces away from motion direction of the device, and
wherein the calculation further includes one or more user social network interacting operations, and the one or more information placement parameters are updated based on the calculation including the user social network interacting operations.

10. A method of claim 9, further comprising:
upon detecting turning or approaching a traffic junction by the device, temporarily suspending the display of the copy of the information placement on the device; and
replacing the information placement on the location-based public display based on the one or more other user operations and the calculation.

11. An apparatus comprising:
at least one processor; and
at least one memory including computer program code for one or more programs,
the at least one memory and the computer program code configured to, with the at least one processor, cause the apparatus to perform at least the following,
process a data stream associated with a device to extract one or more data sets;
upon detecting that the device is proximate to a location-based public display which is bound to a geographic location, determine one or more arbitrary events data sets from among the one or more data sets based on a coincidence of the one or more arbitrary events data sets with the location-based public display, wherein the coincidence includes temporal proximity, spatial proximity, or a combination thereof, of user behaviors, user devices, user operations on the user devices, or a combination thereof;
initiate a display on the device of a copy of an information placement on the location-based public display facing a motion direction of the device, wherein the display of the copy of the information placement occurs in real time or substantially in real time with the detecting and continues after the device faces away from the location-based public display, temporarily disappears until moving away beyond a predetermined distance from the location-based public display, and reappears when moving into the predetermined distance from the location-based public display;
calculate a user view-through rate, a user click-through rate, and a user purchase rate associated with the copy of the information placement on the device; and update one or more information placement parameters for the location-based public display based on the calculation,
    wherein the one or more arbitrary events data sets include a user view-through operation, a user click-through operation, a user purchase operation, and information of one or more other user operations performed at the device.

12. An apparatus of claim 11, wherein the extraction of the one or more data sets, the determination of the one or more arbitrary events data sets, or a combination thereof, occur in real time or substantially in real time with the detecting and is based on a word and phrase extraction reflecting user knowledge, one or more data models, one or more data normalization processing models, or a combination thereof, and wherein each of the one or more data models and one or more data normalization processing models classifies certain values as normal and other values as outliers or exceptions.

13. An apparatus of claim 11, wherein the apparatus is further configured to:
    determine one or more operations performed by the least one device in contextual proximity to the one or more arbitrary events data sets, the location-based public display, or a combination thereof, and
    wherein the one or more information placement parameters are further based on the one or more operations.

14. An apparatus of claim 13, wherein the apparatus is further configured to:
    determine archetypal information, one or more behavioral models, or a combination thereof for a user of the device based on the one or more arbitrary events data sets, the one or more operations, or a combination thereof, wherein the archetypal information is determined based, at least in part, on user preferences, and the one or more behavioral models are determined based, at least in part, on user behaviors, and
    wherein the one or more information placement parameters are further based on the archetypal information.

15. An apparatus of claim 14, wherein the data stream, the one or more data sets, the one or more arbitrary events data sets, or a combination thereof include positioning data gathered from map content information, one or more location-based services, or a combination thereof.

16. An apparatus of claim 15, wherein the apparatus is further configured to:
    initiate a binding of the positioning data to the archetypal information, the one or more behavioral models, or a combination thereof to determine one or more user intents with respect to the location-based public display.

17. An apparatus of claim 16, wherein the apparatus is further configured to:
    determine the one or more information placement parameters based on the binding, the positioning information, or a combination thereof.

18. An apparatus of claim 13, wherein the apparatus is further configured to:
    initiate a construction of at least one normal distribution of the one or more arbitrary events data sets in relation to the one or more operations; and
    determine one or more outlier areas of the at least one normal distribution,
    wherein the one or more information placement parameters are further based on the one or more outlier areas.

19. An apparatus of claim 13, wherein the one or more operations include one or more input operations, one or more output operations, one or more view-through operations, one or more click-through operations, or a combination thereof.

20. An apparatus of claim 11, wherein the apparatus is further configured to:
    determine the information placement based on whether the information placement is a focal point of the device.

* * * * *